US010437898B2

(12) United States Patent
Temby

(10) Patent No.: US 10,437,898 B2
(45) Date of Patent: Oct. 8, 2019

(54) SYSTEMS AND METHODS FOR TARGETED CONTENT PRESENTATION BASED ON SEARCH QUERY ANALYSIS

(71) Applicant: DAC GROUP (HOLDINGS) LIMITED, Toronto (CA)

(72) Inventor: Daniel Temby, Mississauga (CA)

(73) Assignee: DAC Group (Holdings) Limited, Toronto (CA)

( * ) Notice: Subject to any disclaimer, the term of this patent is extended or adjusted under 35 U.S.C. 154(b) by 508 days.

(21) Appl. No.: 15/145,629

(22) Filed: May 3, 2016

(65) Prior Publication Data

US 2016/0328484 A1    Nov. 10, 2016

Related U.S. Application Data

(60) Provisional application No. 62/156,712, filed on May 4, 2015.

(51) Int. Cl.
| | |
|---|---|
| *G06F 16/9535* | (2019.01) |
| *G06F 16/29* | (2019.01) |
| *G06F 16/28* | (2019.01) |
| *G06F 16/22* | (2019.01) |
| *G06F 16/955* | (2019.01) |
| *G06Q 30/02* | (2012.01) |

(52) U.S. Cl.
CPC ...... *G06F 16/9535* (2019.01); *G06F 16/2272* (2019.01); *G06F 16/284* (2019.01); *G06F 16/29* (2019.01); *G06F 16/9558* (2019.01); *G06Q 30/0251* (2013.01)

(58) Field of Classification Search
CPC ......... G06F 17/30867; G06F 17/30241; G06F 17/30336; G06F 17/30593; G06F 17/30882; G06Q 30/0251

USPC ......................................................... 707/706
See application file for complete search history.

(56) References Cited

U.S. PATENT DOCUMENTS 9,118,778 B2 *  8/2015  Altberg .................. G06Q 30/02
9,171,322 B2 * 10/2015  Spievak ............. G06Q 30/0275
(Continued)

FOREIGN PATENT DOCUMENTS

EP           2 299 396 A1     3/2011

OTHER PUBLICATIONS

European Examination Report issued in corresponding European Application No. 16 168 408.9, dated Aug. 7, 2017, 6 pages.
(Continued)

*Primary Examiner* — Pierre M Vital
*Assistant Examiner* — Alicia M Antoine
(74) *Attorney, Agent, or Firm* — Eric L. Sophir; Dentons US LLP

(57) ABSTRACT

Systems and methods described herein allow multiple actors to cooperatively establish a common pool of funds to be dynamically applied to purchasing online advertising keywords associated with ad units. Participants of the portfolio of advertising keywords and associated ad units may contribute a desired amount, and receive a proportionate amount of traffic, which may be automatically controlled so that output traffic is proportionate. Participants may also contribute to a common pool of funds, and the systems and methods may automatically determine an equitable amount of money each participant should be charged, based on the amount visitor output is driven to the respective participants.

18 Claims, 6 Drawing Sheets

(56) References Cited

U.S. PATENT DOCUMENTS

| | | | | |
|---|---|---|---|---|
| 2007/0198339 A1* | 8/2007 | Shen | ................ | G06Q 30/02 |
| | | | | 705/14.64 |
| 2011/0066498 A1* | 3/2011 | Wojcicki | ................ | G06Q 30/02 |
| | | | | 705/14.55 |
| 2012/0259695 A1 | 10/2012 | Glassman et al. | | |
| 2013/0012158 A1* | 1/2013 | Altberg | ................ | G06Q 30/02 |
| | | | | 455/406 |
| 2015/0046254 A1* | 2/2015 | Raab | ................ | G06Q 30/0248 |
| | | | | 705/14.47 |
| 2016/0210649 A1* | 7/2016 | Buckholdt | ......... | G06Q 30/0214 |

OTHER PUBLICATIONS

European Search Report dated Aug. 25, 2016 in European Application No. 16168408, 7 pages.

\* cited by examiner

SYSTEMS AND METHODS FOR TARGETED CONTENT PRESENTATION BASED ON SEARCH QUERY ANALYSIS

CROSS-REFERENCE TO RELATED APPLICATIONS

This application claims a benefit of priority to U.S. Provisional Application No. 62/156,712, titled "SYSTEMS AND METHODS FOR AUTOMATED COORDINATION OF SEARCH ENGINE MARKETING," filed on May 4, 2015, which is fully incorporated by reference for all purposes.

TECHNICAL FIELD

Generally, the present disclosure relates to search engine query analysis. More particularly, the present disclosure relates to targeted content presentation based on search query analysis.

BACKGROUND

Computerized search services, such as consumer search engines (e.g., Google®, Bing®, Yahoo!®), implement computerized, predetermined search algorithms to allow users to search computer resources, such as websites or databases. Users enter a search query comprising strings of alphanumeric characters or words. The search engine algorithms use the search query to approximate and locate the resources (e.g., website, machine-readable computer file) sought by a user. Some commercial search engines allow advertisers to "purchase" keywords as a revenue stream. In these scenarios, the search engine algorithmically determines a price for the advertisers to purchase a keyword. Although frequently computerized to some degree, the pricing algorithms are frequently auction-based or market-driven so that the price of a particular keyword is sensitive to the search popularity of the particular keyword. For example, common words for marketable consumer products, such as "dress" and "shoes," are likely more expensive for advertisers, compared to words for academic concepts, such as "constructivism" and "relativism."

The moment at which advertisers are charged for the keywords may vary. In some cases, advertisers could be charged up front, at the time they buy advertising space associated with the keyword, or they may charged "per click." Under a pay-per-click scheme, when an advertiser pays to be associated with a keyword, the advertiser will provide the search engine with an advertisement they wish to be displayed when the keyword is part of a user's search query. The advertiser is then charged for the keyword if the user clicks on the advertisement. The actual price for the keyword is often fluid and dynamically calculated. The cost of a keyword is usually determined on a periodic basis or at the time the user clicks the advertisement, and is usually based on the popularity of the keyword (i.e., how often the keyword is searched within a predetermined time period).

Search engine marketing ("SEM") refers to a marketing practice that attempts to capitalize on the technology of search engines, while strategically gaming the pricing structure for keyword advertising. Advertisers pay for hyperlinks, usually in the form of brief advertisements or graphics that are presented with the search engine's search results, to be associated with keywords that are relevant to their businesses. In other words, SEM is the paid injection of content to be associated with a strategic set of keywords. In many cases, the advertisers may place parameters on the advertisements to be displayed, such as identifying a particular geographic location or media market that the advertiser would like to have associated with their ad unit.

Local search engine marketing, i.e., SEM techniques geared towards a particular location or media market, is traditionally associated with small-business owners who purchase ad unit "space" featured somewhere on a search results page. Typically, the space purchased is as associated with a keyword so that the advertiser is featured when a user's search string contains that keyword. The problem for smaller business entities or franchisees of a larger conglomerate is that SEM techniques are not always a beneficial, efficient, or effective on a local scale; even though SEM is one of the most effective ways of delivering a message to possible customers.

Dense Markets

One complication is that markets are sometimes dense. For example, franchisees of a corporation may have a large number of competing franchisees in the same market—not to mention franchisees of competing companies. Companies often allow franchisees' territories to overlap. Beside cannibalism among co-franchisees of the same parent company, one problem is that consumers may get confused by the overlapping options presented to them, since there is often no way for the average consumer to immediately distinguish the franchisees. One option for advertising online would be to jointly pursue an SEM agenda to drive consumer traffic to their websites. However, it would be a problem for co-franchisees to then distribute or share business leads, since the parties would debate whether to have an even distribution (same number) or an equitable distribution (proportionate to what is contributed) among them.

Equitable distribution is not always easy from a technical perspective, because certain targeting features enabled within the SEM advertising platforms may not align with business boundaries of the parent company, or as agreed by the franchisees. Thus, the issue here remains overlapping territories; particularly in dense markets.

Daunting Costs for Advertising

Another complication is that online advertising is often cost prohibitive; at the very least, it may be intimidating for some small businesses to spend the amount of money necessary to launch an effective SEM campaign. One common scenario is where an independent business owner selling a product in a product market having notoriously high cost-per-click advertising costs. In cost-per-click schemes, advertisers pay search engines like Google® for the right to advertise based on certain keywords, and the advertiser is charged their service fee based on the traffic generated when their advertisements are presented during keyword searches, and then their advertisement is later clicked. An additional cost for effective SEM campaigns are the fees for hiring a SEM service to help consult and manage the SEM campaign. In some cases, these services can cost about half the anticipated advertising budget. What is needed is a way to aggregate the advertising budgets of multiple companies or franchisees, so the costs are shared Inefficiencies of Disparate Campaigns Yet another complication is the inefficiencies that go with running all of these campaigns, which may corrupt the auction dynamics for a keyword. For example, when multiple co-franchisees are all bidding for the same keywords in a pay-per-click environment, in an overlapping territory, they end up inadvertently driving up the costs of those keywords. The algorithms of the search engines that determine the costs of the keywords do not account for this type of friendly fire, so the co-franchisees or cooperating business owners may corrupt the automated dynamics of the auction, by all going after the same keywords at the same time. This may be problematic for a parent company, because the franchisees are members of the same brand.

Lack of Control, or perception thereof; Cannibalism

Still another complication is that small-businesses and big corporate parent companies may perceive that there is a lack of control over online advertising, and thus SEM services may be a moot expense since the online advertising is uncontrollable, if not entirely random. One concern for implementing a joint-advertising, particularly at a higher-level of the corporate parent level, is that there is no mechanism to centralize the way SEM services and/or franchisees spend their advertising money. As a result, corporate franchisors will often counter-intuitively relinquish responsibilities over online brand messaging to the franchisees of each market. This practice may or may not produce great online marketing results.

Another common result is cannibalism among co-franchisees who, instead of competing with one another, should have some distinction within their territories and/or product markets. What is needed is a way for online marketing to be centrally managed. What is needed is a way to mitigate cannibalism, and instead help facilitate franchisees to leverage a very large asset: the network of co-franchisees. Ultimately, at least in the online marketing context, the franchisees who usually opted into the corporate network because presumably the franchisees wanted to be part of something bigger and have the credibility of brand recognition, end up competing against their co-franchisees and their network, instead of working with the network.

Shortcomings of Online Advertising Consultants and Tools

What is needed is a way to help facilitate more effective online advertising among local small businesses. What is needed is a way too pool resources to spread costs for advertising and costs for SEM services. What is needed is a way to equitably distribute the outcomes and the costs associated with the online search campaign. Having human SEM consultants may not satisfy these needs due to human inefficacies or the simple impossibility for humans to be a party to computer-based communications and processes.

A technical and computerized solution is needed for the problems discussed above: fierce market competition, daunting costs (particularly for smaller entities), campaign inefficiencies, cannibalism, and the perceived absence of tactical control over advertising campaigns. Specifically, what is needed is a coordinated SEM computing platform that is capable of coordinating a multitude of issues arising during an SEM campaign. More specifically, what is needed is an SEM platform capable of supporting an SEM strategy while mitigating cannibalism in a market. What is also needed is an SEM platform that simplifies the purchase and payment processes for coordinating SEM efforts for multi-advertiser portfolios.

SUMMARY

One embodiment comprises a method for targeted content presentation, the method comprising: in response to an activation of a hyperlink underlying a graphical presentation of a content unit in a search result page dynamically output by a first network server and comprising a plurality of search results associated with the content unit based on a search query submitted via a client computer associated with the activation: receiving, by a second network server, over a wide area network, a request from the client computer based on the activation, wherein the request requests a landing page from the second network server to be presented in a browser running on an operating system of the client computer; identifying, by the second network server, a characteristic of the client computer based on the request; sending, by the second network server, over the wide area network, the characteristic to an application server; in response to receiving, by the application server, over the network, the characteristic: accessing, by the application server, a database storing a plurality of records, wherein each of the records contains a service provider identifier associated with the content unit and a plurality of preference values associated with the service provider identifier; determining, by the application server, a content payload based on the characteristic and the preference values; generating, by the application server, the content payload such that the content payload comprises at least two of the service provider identifiers; sending, by the application server, over the wide area network, the content payload to the second network server; and in response to receiving, by the second network server, over the wide area network, the content payload from the application server: presenting, by the second network server, over the wide area network, the landing page and the content payload to the client computer such that the browser displays at least one of the at least two of the service provider identifiers hyperlinked within the landing page.

Another embodiment comprises a system comprising: a first network server configured to receive, over a wide area network, a request from a client computer in response to an activation of a hyperlink underlying a graphical presentation of a content unit in a search result page dynamically output by a second network server and comprising a plurality of search results associated with the content unit based on a search query submitted via the client computer associated with the activation, wherein the request requests a landing page from the first network server to be presented in a browser running on an operating system of the client computer, wherein the first network server is configured to identify a characteristic of the client computer based on the request; and an application server configured to receive the characteristic from the first network server, wherein the application server is configured to access a database storing a plurality of records, wherein each of the records contains a service provider identifier associated with the content unit and a plurality of preference values associated with the service provider identifier, wherein the application server is configured to determine a content payload based on the characteristic and the preference values, wherein the application server is configured to generate the content payload such that the content payload comprises at least two of the service provider identifiers, wherein the application server is configured to send, over the wide area network, the content payload to the first network server such that the first network server, in response to receiving, over the wide area network, the content payload from the application server is able to present, over the wide area network, the landing page and the content payload to the client computer such that the browser displays at least one of the at least two of the service provider identifiers hyperlinked within the landing page.

The systems and methods disclosed herein address the above-discussed shortcomings in the art, and provide a number of other benefits. The systems and methods described herein provide for a platform of dynamically determining how to allocate expenses and costs across a group of participants, where the expenses or costs relate to any localized or dedicated marketing payments expended by the group, and the allocation of those costs is results-based (i.e., results of the marketing efforts) with the goal of assigning every participant an equitable outcome (i.e., consumer traffic, and expense/cost allocation). Exemplary uses of this technology may include search engine marketing (SEM) efforts, but may also include local display media, social marketing efforts, or a subscription-based search engine optimization (SEO) program. Embodiments of the systems and methods described herein allow multiple participants to cooperatively establish a marketing portfolio comprising a common pool of funds, advertising keywords and/or ad units. The common pool of funds may be dynamically applied to purchasing online advertising keywords that may be associated with the ad units, which may be provided to consumers. Participants of the portfolio of advertising keywords and associated ad units may contribute a desired amount, and receive a proportionate amount of traffic, which may be automatically controlled so that output is proportionate. Participants may also contribute to a common pool of funds, and the systems and methods may automatically determine an equitable amount of money each participant should be charged, based on the amount visitor output is driven to the respective participants. Some systems and methods may allow high level control over multiple portfolios, which may be grouped based on commonalities, such as geographic markets. Data related to output traffic and interactions may be gathered over time, and may be used as feedback to dynamically adjust the way in which participants are presented to visitors so the participants receive an equitable amount of traffic based on their contributions; but the feedback may also be used as to dynamically adjust the way in which participants are billed based on the amount of output traffic they receive. The data may also be used to help provide greater insights into the effectiveness of particular portfolios of an advertising campaign, and which advertising portfolios are more successful than others. Similarly, the data may help identify which participants are more successful than others. Systems and methods may communicate with a search engines to simplify and automate the payment process for multiple search engines, and to help derive even more search engine data used to calculate certain predicative variables. Systems and methods may also provide for tracking and monitoring multiple channels of output traffic, beyond only hyperlink clicks.

It should be appreciated that other embodiments may be used and/or other changes may be made without departing from the spirit or scope of the present disclosure. The illustrative embodiments described herein are not intended to be limiting upon the subject matter presented herein.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
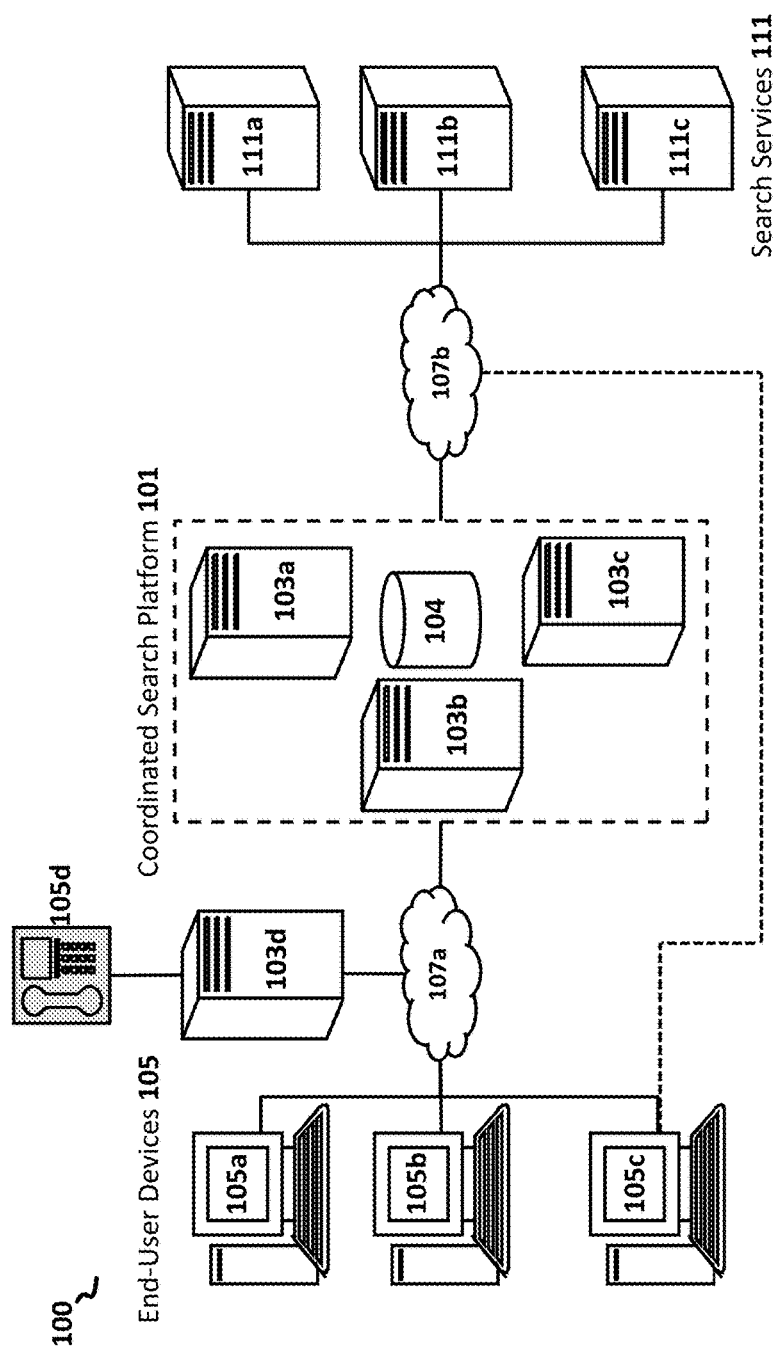
FIG. 1 is a diagram showing components of a system embodiment, according to an exemplary system embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The embodiments disclosed herein describe a computing platform comprising hardware and software components that provide tools for dynamically allocating costs among a group of participants. The costs may be any localized, or otherwise categorized, marketing expense, and the software modules may determine allocation based algorithms that work towards an equitable outcome for each participant. Equitable outcome may be defined by the participants or system administrators, and may generally reference the allocation of expenses, the distribution of any income, and the adjustment of the marketing strategy so as to provide the appropriate amount of consumer traffic to a participant. As an example, participants may allocate costs equally and thus each time the participants are displayed to consumers, the software may determine which participant should be displayed most prominently according to a predetermined sequence or set of rules. As another example, participants may allow each of the participants to contribute as much or as little as each participant would prefer, causing the software modules executed by the exemplary embodiment to determine how participants should be displayed to consumers such that the resulting consumer traffic provided to each respective participant is a function of how much cash or other resources the participant contributed for the portfolio.

The exemplary embodiments presented herein describe an allocation platform that implements a joint-search engine marketing (SEM) effort or any form of paid traffic generation. However, it should be appreciated that additional or alternative embodiments of allocation platforms are not limited to such practice. Other, non-limiting, examples may include local display media, social marketing, or a monthly subscription to a Search Engine Optimization (SEO) program. That is, embodiments of an allocation platform may include any system or method that comprises the features and functions described herein and may help coordinate a variety of online or digital marketing channels for any number of participants. As an example, embodiments may provide for purchases of pooled-display media or social campaigns. Embodiments may receive instructions, funding, and offer services to any type of marketing sources, which may allow for the identification of a variety of ad unit distribution channels, and a variety of funding types and schemes. As an example, although the exemplary embodiments operate in an environment that implements a pay-per-click scheme for assessing charges to a portfolio, it should be appreciated that other cost schemes may be contemplated, based on each marketing channel's choice for determining its revenue. Non-limiting examples of how channels may assess costs to portfolios may include: cost per thousand impression (CPM) channels (e.g., display media, and social marketing), and subscription or cost-per-period programs where there may be a fixed monthly fee imposed regardless of the traffic or impression volumes. In any event, embodiments may distribute costs equitably to participants and generate consumer traffic equitably. In some cases, the determination of "fairness" or "equity" may be based upon outcomes (i.e., consumer traffic measurements) and predictive decisions made by software modules, which may predict which participant to expose and when to shift exposure to ensure maintenance of equity.

An allocation platform may manage and calculate costs associated with pooling marketing efforts among participants. The allocation platform may aggregate participant funds into a common account, and determine an equitable distribution of costs according to various factors, metrics, and predetermined allocation rules, which may instruct the servers of the allocation platform how to tabulate and distribute costs. Costs may be fees assessed by the particular marketing channels that the participants or the allocation platform have engaged for marketing services. Although the exemplary embodiments described herein describe a marketing channel as a search service (e.g., Google®, Yahoo!®), it should be appreciated that marketing channels are not limited online search services. Non-limiting examples of marketing channels may include the aforementioned search services, but may also include social media websites (e.g., Facebook®, LinkedIn®, Pinterest®), subscription-based marketing platforms, and subscription-based search engine optimization (SEO) services.

In operation, an allocation platform may capture consumer traffic data from any number of sources, such as an automatically generated webpage (e.g., landing page), a participant's webpage, a locally-stored tracking software module (e.g., cookie), or a third-party's webpage. A consumer's behavior may be monitored and captured by the servers hosting the particular source and transmit behavior data back to a server of the allocation platform. The allocation platform may receive the consumer information from different types of sources, through an associated marketing channel, and may then generate an ordering of how participants should be presented to a consumer who is searching for, or determined to be in need of, one or more services provided by the participants. In other words, the allocation platform may gather information about how prior and/or present consumers behave when interacting with marketing materials for the participants, to determine how to present the participants to the present consumer (e.g., sequential ordering, prominence). The allocation platform may ultimately determine which participant should be presented most or least prominently according to which methodology the allocation platform implements to determine equity in consumer traffic, or other predetermined outcome metric (e.g., purchases, website traffic, telephone calls).

For example, a local digital marketing distribution system can be designed to be used by multiple business entities (participants') who occupy the same (or similar) geographic space/market area and product or service vertical who are all competing for the same audience using local digital marketing techniques. The participants each contribute their own desired level of budget into a cooperatively established common pool of funds which will then be used to fund local digital marketing activity—driving traffic to one or more landing pages where the local digital marketing distribution system is configured to predictively display one or more of the participants (a 'payload') in a specific order with a primary view of achieving a uniform cost-per-goal across the participant base. A 'goal' being a positive business outcome—for example, the completion of an online form or placing a phone call to one of the participants by a potential consumer (visitor'). This can be used, for instance, in an insurance agent client network where there are many agents all vying for the same prospects in a dense urban market, such as Chicago or Atlanta.

In particular, many platforms and advertising publisher systems exist today that allow businesses of any size to directly market themselves online to a local targeted audience. In most cases, however, there are significant issues that arise when attempting to do so. Some of such issues include increased costs, prohibitive cost of entry, consumer confusion/brand and messaging compliance, inefficiencies, and transparency of group initiatives.

Increased costs—many local digital media options are priced using an auction or demand-based pricing system (e.g. Google's AdWords platform). In these cases, many people bidding for the same keywords in the same place at the same time can inflate the cost of that media.

Prohibitive cost of entry—for some industry verticals in some markets, the relative competition for local exposure can create entry costs that far exceed the budgets afforded by independent business owners thus removing them from consideration by new prospects.

Consumer confusion/brand & messaging compliance—within business networks such as agent networks or franchise systems, each business unit running its own direct online advertising in one market can lead to a broad range of messaging that may stray from corporate trademark and branding standards creating a confusing and diluted business message to the intended audience.

Inefficiencies—where independent businesses decide to employ a marketing professional or agency to conduct these campaigns on their behalf, the administrative fees associated with such services can become a disproportionate percentage of the overall media budgets making them difficult to justify.

Transparency of group initiatives—often times, independent businesses within a market will group together to form ad-pools or co-operatives in order to pool resources and streamline administrative overheads. In these cases, however, there is no guarantee of equitable outcomes for all participants and often, the results are opaque and do not directly inform every pool member of their specific return on investment.

The local digital marketing distribution system can include various technical components, such as a general administrative interface, source definitions, trafficking & budget briefs, efficiency index, and apportioning engine.

The general administrative interface is configured to pool and organize advertising participants along with their discrete, independent budgets into groups that are reflective of common/similar attributes. i.e. geography, service being advertised, etc.

The source definitions configure the local digital marketing distribution system to expect traffic from various online traffic sources and instruct the local digital marketing distribution system on how to identify and calculate/estimate the cost of each session arriving from those sources.

The trafficking & budget briefs provide instructions to marketers on the orchestration and execution of the collective budgets across the appropriate geographies and marketing sources.

The efficiency index evaluates available information and select from the total available pool, an appropriate payload of advertising participants to be populated on a landing page that has been requested by a visitor after responding to a correctly configured piece of local online marketing.

The apportioning engine tracks the visitor's activity and behavior then distribute the cost of that particular session among the included advertising participants appropriately.

The efficiency index is a numeric index that enables sorting of viable participants for any given visitor's session into an order that gives the local digital marketing distribution system the best likelihood to maintain the lowest possible standard deviation of cost-per-goal across all participants or to spend each participants available budget in a proportionally equal way.

Expressed mathematically, the efficiency index calculates as follows:

$$Ef(p) = C(\text{spend bias}) \times \left[ \frac{\frac{p(\text{amt spent})}{p(\text{budget})} - \frac{\sum_P^p p(\text{amt spent})}{\sum_P^p p(\text{budget})}}{\frac{\sum_P^p p(\text{amt spent})}{\sum_P^p p(\text{budget})}} \right] +$$

$$100 \times C(\text{CPG bias}) \times$$

$$\left\{ \frac{\frac{p(\text{amt spent})}{p(\text{goal count})}\left[1 + p\left(\begin{array}{c}\text{performance}\\\text{advantage}\end{array}\right)\right] - \frac{\sum_P^p \left[\frac{p(\text{amt spent})}{p(\text{goal count})}\left[1 + p\left(\begin{array}{c}\text{performance}\\\text{advantage}\end{array}\right)\right]\right]}{G(\text{participation count})}}{\frac{\sum_P^p \left[\frac{p(\text{amt spent})}{p(\text{goal count})}\left[1 + p\left(\begin{array}{c}\text{perf}\\\text{adv}\end{array}\right)\right]\right]}{G(\text{participation count})}} \right\}$$

$$- \left[ \frac{X\left(\begin{array}{c}\text{conv}\\\text{chance}\end{array}\right) - \frac{G(\text{goal count})}{G(\text{session count})}}{\frac{G(\text{goal count})}{G(\text{session count})}} \right]$$

Efficiency Index Definitions

Ef(p) will be the resulting efficiency index value for a given participant for a given visitor session and will, when sorted in an ascending manner, determine the rank in which that participant will be viable for inclusion in the landing page payload.

C(Spend Bias) and C(CPG Bias) will be administratively configured real numbers who's sum will total 1.0 in order to bias the outcome of the efficiency index towards either equitably depleting participant's budgets or maintaining the lowest possible cost-per-goal deviation among participants.

p(amt spent) and p(budget) will be real numbers representing per-participant values of current budget depletion and total budget respectively for the current cycle (monthly by default).

p(goal count) will be an integer representing the current number of goal events that a particular participant has received so far.

p(performance advantage) will be an administratively configured real number which when compared to 1.0 will indicate if a particular participant is to receive an advantage (or disadvantage) in their cost-per-goal when compared to the total group of participants G(participation count) will be an integer representing the total number of participants available for selection for the specific incoming visitor session.

X(conversion chance) will be a real number between 0 and 1 produced by a prediction system, whether separate or integrated, using past user behavior combined with contextual information about the specific incoming visit to produce an estimate of the likelihood that the visitor will trigger a goal event for one of the participants in the delivered payload G(goal count) will be an integer representing the total number of goal events that have been triggered within the program since it became active.

G(session count) will be an integer representing the total number of independent visitor sessions that have been created since the program became active.

The apportioning engine uses clickstream data it collects from the visitor along with previously collected and calculated data to determine how much budget to deplete from each participant involved in each visitor payload.

The relative occurrence of each tracked event compared to goal-events constitutes its weight. The count of events that occur per visitor session per participant are then used in conjunction with these weight values to determine how much of the X(visit cost) value should be depleted from each participant active in the visitor's session.

Expressed mathematically, the apportioning engine calculates as follows:

Let $\varepsilon$ = the set of non-goal events which affect cost distribution

Let $C$ = the set of configuration values

Let $X(*)$ = calculated data from a separate subsystem

Let $P$ = the set of participations in the applicable group for this session

Let $p$ = one particular participation, $p \in P$

Let $WP(p)$ = weighting points for participation $p$ $$WP(p) = \sum_{\varepsilon}^{e} \left\{ p(\text{count}[e]\text{this session}) \times \frac{G(\text{total}[\text{goals}])}{G(\text{total}[e])} \right\} +$$

$$C(\text{goal weight}) \times p\left(\frac{\text{total}[\text{goals}]}{\text{this session}}\right)$$

$$\text{Cost}(p) = X(\text{visit } \text{cost}) \times \frac{WP(p)}{\sum_P^p WP(p)}$$

apportioning engine definitions

X(visit cost) is a real number produced by a prediction system, whether separate or integrated, using historic marketing expense data combined with contextual information about the specific incoming visit to produce an estimate of the material cost of that particular session which is then to be distributed among the payload participants based upon visitor's behavior.

C(goal weight) will be a real number assigned to each goal event configured in the system. The default goal will carry a value of 1.0 and each subsequent goal will carry an administratively configured real number which, when compared to 1.0 will allow the relative business value of each goal to be considered when apportioning and distributing costs.

Cost(p) will be the resulting amount to be depleted from a particular participant involved in a visitor payload Components of Exemplary System FIG. 1 is a diagram showing components of a system 100 for automated coordination of search engine marketing (SEM), according to an exemplary embodiment. The system 100 may provide an SEM service for participants to pool their respective resources to instantiate a cooperative, equitable, and coordinated SEM advertising portfolio or campaign of one or more portfolios. The system 100 may comprise a coordinated search engine marketing service platform (SEM service 101), end-user devices 105, communications networks 107, and search services 111.

Coordinated SEM Service Platform

An SEM service platform 101 may be a computing service hosted on any number of computing devices, such as SEM servers 103, accessible over a network 107 to various types of end-user devices 105. In addition to SEM servers 103 that host the various components of the SEM service platform 101, the SEM service platform 101 may also comprise databases 104 that store records of data relating to participants, participant portfolios, historic keyword data, and marketing characteristics, variables corresponding to those characteristics, and updateable algorithms for determining the appropriate display of dynamic information to consumer devices 105c. In some cases, the SEM service platform 101 may comprise an administrator's end-user device (administrator device 105a), which may control execution of the various tasks and monitor the various devices 103, 104 of the SEM service platform 101. The SEM service platform 101 may operate in a number of geographic locations, and so the SEM service platform 101 may comprise a number of physical facilities (e.g., data centers) that host various devices associated with the SEM service platform 101 (e.g., servers 103, databases 104, administrator device 105b). The SEM service platform 101 may include or be a component of the allocation platform, as disclosed herein.

An SEM server 103 may be any computing device comprising a processor and non-transitory machine-readable storage media, where the storage medium stores software modules and other data that are used by the processor to execute the various tasks and processes described herein. Non-limiting examples an SEM server 103 may include a server computer, a workstation computer (e.g., personal computer (PC)), and the like. The SEM service platform 101 may be a computing service hosted on SEM servers 103 that execute software applications with various sub-components that, when executed by the SEM servers 103, provide end-users or associated computing systems (e.g., search services 111) with the features and data related to the SEM service platform 101.

Although the various embodiments described herein, such as the exemplary system 100 seen in FIG. 1, may comprise two or three SEM servers 103, it should be appreciated that the SEM service platform 101 may comprise any number of SEM servers 103. It should also be appreciated that SEM servers 103 may be responsible for executing any number of software modules and/or serving any number of functions. As an example, the SEM service platform 101 may comprise a single SEM server 103 responsible for hosting a database 104 that stores all data records for the SEM service platform 101 and executing various software modules that provide users with the functionality of the SEM service platform 101. As another example, the SEM service platform 101 may comprise a plurality of SEM servers 103, each of which are responsible for executing various tasks or processes. In such an example, the SEM service platform 101 may comprise a first SEM server 103a that executes software modules hosting a Bid Management Platform, a second SEM server 103b that executes software modules of a local SEM management engine, and a third SEM server 103c that executes software modules establishing a webserver that hosts a website associated with the SEM service platform 101. In some embodiments, the SEM service platform 101 may be arranged in a distributed computing architecture, where the SEM servers 103 implement load-balancing and/or redundancy techniques, to share responsibilities and various functions of the SEM service platform 101.

Bid Management Platform

The SEM service platform 101 may comprise one or more servers 103 configured to function as a Bid Management Platform server ("bid platform") 103a. The bid platform 103a may be any combination of software components and hardware components capable of executing the various tasks and processes described herein. The bid platform 103a may communicate over networks 107 with a number of computing devices, both external and internal to the SEM service 101. External devices may include certain end-user devices 105 (e.g., a consumer device 105c), and devices hosting search services 111. Internal devices may include a webserver 103a, certain end-user devices 105 (e.g., an administrator device 105a), and a database 104.

SEM Management Engine

The SEM service platform 101 may comprise a local SEM management engine (SEM engine) 103b, which may be a computing service of the SEM service platform 101 hosted on any number of SEM servers 103 comprising a processor and that are capable of performing the various tasks and processes described herein. The SEM engine 103b may be communicatively coupled with an SEM database 104 storing participation records, and one or more end-user devices 105. The SEM engine 103b may receive instructions or other forms of data, such as the participant records. The SEM engine 103b may use the instructions or participation records to execute its various functions.

In some embodiments, the SEM engine 103b may receive one or more variables from a webserver 103c to determine which payload content should be presented to on a landing page. The payload content may comprise advertising and various contact points associated with one or more participants presented on the landing page. The SEM engine 103b provide scripting code modules to the webserver 103c, which the webserver 103c may use to monitor various interactions of a visitor to the landing page. The various interactions may be reported back to the SEM engine 103b, which may update participation records in a database 104, and update the various algorithms used to determine the payload content to be presented on the next landing page. The SEM engine 103b may be configured to dynamically determine which payload content should be displayed based on the equitable distribution of most likely output traffic to result from placement or organization of the landing page, which may be based on the amount each participant has contributed to the portfolio. The SEM engine 103b may also dynamically identify the various forms output resulting from a visitor's interactions with a landing page. The SEM engine 103b may update records and may then determine how the equitably distribute the costs of the landing page. That is, because the visitor clicked on the hyperlink directing the visitor's computing device 105c to the landing page, the search service 111 may charge a portfolio's account a predetermined or dynamically-determined amount of money. Here, the SEM engine 103b may automatically determine the equitable distribution of costs based on the amount each participant is receiving output traffic and the amount the participant wishes to contribute to the portfolio account.

Output may be certain types of contact points between participants and visitors to the landing page. Non-limiting examples of the types of contact points constituting output traffic may include visitors clicking on a hyperlink linking to a participant's website, visitors calling a participant's phone number listed on the landing page, visitors clicking on an email link to request more information from the participant, and the like. In some embodiments, the system 100 may implement a phone tracking system that may be communicatively coupled to an SEM engine 103b, and may track visitor phones 105d using various software modules that are configured to facilitate telephony and tracking.

In the exemplary system 100, a programmatic telephony service 103d may be hosted on one or more computing devices. The SEM engine 103b or webserver 103c may instruct the telephony service 103d to dynamically provision a unique phone number or an extension number to a phone number when the landing page loads. That way, if and when a visitor to the landing page dials the number with their telephone 105d, that phone number or extension will bind that phone call to the instance of the webserver 103c or SEM engine 103b communicating with the visitor's computing device 105c. Thus, the SEM engine 103b may receive the marketing output data so that it may determine the output costs and distribute those costs across the portfolio, even though the output traffic occurred in a different channel (i.e., telephony, not Internet traffic).

The SEM service platform 101 may comprise one or more computing devices configured to function as a webserver 103c. A webserver 103a may be any combination of software components and hardware components capable of executing the various tasks and processes associated with generating and presenting a GUI for a web browser (e.g., website), a mobile application, or other client-side software application. The webserver 103a may communicate over networks 107 with a number of computing devices, both external and internal to the SEM service platform 101. Non-limiting examples of external devices may include certain end-user devices 105 (e.g., customer device 105b, consumer device 105c), and devices hosting search services 111. Non-limiting examples of internal devices may include certain end-user devices 105 (e.g., an administrator device 105a), a bid platform 103a, and a database 104.

In some embodiments, the webserver 103a may generate a webpage or website ("landing page") containing advertisements associated with customers (i.e., advertising companies) of the SEM service platform 101, which is then presented as a GUI to a consumer device 105a. A search service 111 may present search results to the consumer device 105c that contain a hyperlink directing the consumer device to the landing page hosted by the webserver 103a. In some embodiments, the webserver 103a may also host websites and/or domains on behalf of the customer; and in some embodiments, the consumer device 105c may be redirected to another webserver hosting the website of the customer, when the consumer selects another hyperlink or advertisement presented on the landing page. The webserver 103a may communicate with a bid platform server 103a and a management engine server 103b, which may be responsible for determining which customer advertisements should be displayed on the landing page. The webserver 103a may dynamically generate the landing page based on the information provided by the bid platform 103a and management engine 103b. That is, the webserver 103a may programmatically generate code or retrieve stored code, for the landing page, based on the information provided form the bid platform 103a and management engine 103b. This way, the landing page may be dynamically generated with the appropriate customer advertisements, based on the consumer's search query.

The SEM service platform 101 may comprise one or more SEM databases 104 that store data related to the SEM service platform 101, such as user records, search records, account information, user credentials, and other forms of information related to the SEM service platform 101. An SEM database 104 may be a software computing application governed by a database management system (DBMS), and may store comprise records of information related the SEM service platform 101. Non-limiting examples of a database and DBMS modules may include MySQL®, Microsoft SQL Server®, Oracle®, IBM DB2®, PostgreSQL, MongoDB, Microsoft Access®, Sybase®, Teradata®, and the like. For example, the database can be relational, in-memory, post-relational, or others. The SEM service platform 101 may comprise a single database 104 organized to store all forms of data necessary to provide users with the functionality of the SEM service platform 101; or the SEM service platform 101 may comprise a plurality of databases 104. For embodiments having multiple databases 104, the databases 104 may be dedicated to a particular function of the SEM service platform 101. For example, one database 104 may store user credentials, while another database 104 stores monetary account data, and still another database 104 may store search engine analytics data. In some embodiments, multiple databases 104 may provide redundancy or load-balancing support; particularly in embodiments where the SEM service platform 101 is hosted in a distributed computing architecture. A database 104 may be hosted on one or more computing devices comprising non-transitory machine-readable storage media storing the software modules associated with the DBMS and database's engine, and a processor capable of executing the various tasks and processes associated with the database engine and DBMS (e.g., fetch records, store records, query records, update records).

End User Computing Devices

End-user devices 105 may be any type of computing device that comprises non-transitory machine-readable storage media and a processor that executes various software modules stored in the memory, such that the end-user device 105 is capable of performing the various tasks and processes described herein. Non-limiting examples of types of end-user devices 105 may include servers, personal computers (PCs), smartphones, tablets, laptops, PDAs, and the like. End-user devices 105 may comprise network interface hardware, such as a network interface card (NIC) in the case of a PC, which may facilitate networked communication over a network 107, between the particular end-user device 105 and the SEM service platform 101. End-user devices 105 may be associated with various audiences, who may have different roles in managing or otherwise using the system 100. The functions and features provided to the end-user device 105 may vary depending on the associated user's role. In some cases, depending on the user's role, the end-user device may receive access or download certain aspects of the system's 100 features.

For example, a member of administrative staff, business staff, or other member of the company hosting the SEM service platform 101, may operate an end-user device 105 configured to be an administrator device 105*a*. Some members of the company hosting the SEM service platform 101, such as administrative staff, may be responsible for managing the technical integrity of the SEM service platform 101 provided to customers of the SEM service platform 101. As such, these members may access an administrator device 105*a* capable of accessing the various technical underpinnings of the SEM service platform 101 to preserve "uptime" of the SEM service platform 101, SEM servers 103, databases 104, and other components, which may include hardware and software components. Some members of the company be business staff, consulting staff, analytics staff, or other functional group responsible for customer service delivery. These members may operate or otherwise be associated with an administrator device 105*a* configured to access, or installed with, software modules that help manage and guide various business aspects of joint-advertising campaigns, such as budget management features, calculators, collaboration tools, and the like.

The administrator device 105*a* may be any computing device comprising non-transitory machine-readable storage media and a processor capable of executing the various tasks and processes described herein. Non-limiting examples of an administrator device 105*a* may include servers, personal computers (PCs), smartphones, tablets, laptops, PDAs, and the like. Administrator devices 105*a* may comprise network interface hardware, such as a NIC card, which may facilitate communication over a network 107, between the administrator device 105*a*, customer devices 105*b*, and the SEM service platform 101. In some implementations, the administrator device 105*a* may access a webserver 103*c* of the SEM service 101 that allows members of the company hosting the SEM service platform 101 to access their accounts and thus access various administrative or service features, based on that member's role within the SEM service platform 101. In some implementations, the administrator device 105*a* may download and install various software modules from the SEM service platform 101, which may provide the administrator device 105*a* with one or more of the various features allotted to the member of the company, based on their role.

Another example of an end-user device 105 may include a customer device 105*b* operated by or otherwise associated with a customer of the SEM service 101. Customers of the SEM service platform 101 may be members of join-advertising efforts, in which customers of the SEM service platform 101 pool their resources to defray costs of advertising through search services 111. The customer device 105*b* may be any computing device comprising non-transitory machine-readable storage media and a processor capable of executing the various tasks and processes described herein. Non-limiting examples of a customer device 105*b* may include servers, personal computers (PCs), smartphones, tablets, laptops, PDAs, and the like. Customer devices 105*b* may comprise network interface hardware, such as a NIC card, which may facilitate communication over a network 107, between the customer device 105*b* and the SEM service platform 101. In some implementations, the customer device 105*b* may access a webserver 103*c* of the SEM service platform 101 that allows customers to access their accounts with the SEM service platform 101 and thus access various features, based on the customer's role within the system 100. In some implementations, the customer device 105*b* may download and install various software modules from the SEM service platform 101, which may provide the customer device 105*b* with one or more of the various features allotted to the customer, based on the customer's role.

Another example of an end-user device 105 may include a consumer device 105*c* operated by or otherwise associated with a consumer searching the Internet or other network using a search service 111. Consumers may be members of the general public using the search service 111 who may be presented with certain advertisements and search results, through a GUI generated by the search services 111, based on their search query. In some embodiments, the consumer device 105*c* may access a search service's 111 website or other interface to search the Internet or other network of resources. The search service 111 may execute the search based on the search query and provide a set of results that offer a link to a webpage for customer of the SEM service platform 101 or a link to a website hosted by a webserver 103*c* of the SEM service platform 101. If the consumer selects this link, the consumer device 105*c* will be directed to a uniform resource locator (URL) address associated with the IP address of the webserver 103*c* or other host server indicated by the link, at which point the consumer device 105*c* begins communicating with the webserver 103*c* or other host server.

The consumer device 105*c* may be any computing device comprising non-transitory machine-readable storage media and a processor capable of executing the various tasks and processes described herein. Non-limiting examples of a customer device 105*b* may include servers, personal computers (PCs), smartphones, tablets, laptops, PDAs, and the like. Consumer devices 105*c* may comprise network interface hardware, such as a NIC card, which may facilitate communication over a network 107, between the consumer device 105*c*, the SEM service platform 101, a network 107 (e.g., Internet), and search services 111. In some implementations, the consumer device 105*c* may access a webserver 103*c* of the SEM service platform 101 by clicking on a link provided to the user in the search service's 111 search results. The webserver 103*c* may provide a webpage of links or advertisements for customers of the SEM service platform 101. In a joint-advertisement effort, the webpage may present links directing the consumer device 105*c* to websites associated with members of the joint-advertisement effort. These websites may be hosted on a webserver 103*c* of the SEM service platform 101, or they may be hosted on other servers that are external to the SEM service platform 101.

Search Services of Search Engines

Search services 111 may be any web-based search engine hosted on one or more computing devices, and may provide users with a computing service for searching the Internet or other network (e.g., a corporate intranet), for resources, such as website or webpage. Non-limiting examples of commercially available search services 111 may include Google®, Yahoo®, and Bing®, among others. Search services 111 may execute one or more search algorithms that provide search results to an end-user workstation 105 based, at least in part, on a keyword search. That is, a consumer operating a consumer device 105*c* may enter a search query comprising one or more words (i.e., one or more strings of data) into a text field of graphical user interface (GUI) presented by a first search service 111*a*, thereby prompting a search for results based on how the words of the query correlate to certain predetermined keywords in a database or index. It should be appreciated that search services 111 may base their search results on several different algorithms and factors, and thus additional searching techniques may still fall within the scope of search services 111 as contemplated herein. Search services 111 may also comprise one or more public or proprietary databases that store resource and keyword indices, keywords, web crawler analytics, keyword analytics, and advertiser account data, amongst other forms of data. Search services 111 may also comprise a webserver that hosts a website that provides users with a web-based interface to input search queries. In some embodiments, advertisers may access the website of the search service 111 to establish an advertiser account. In such embodiments, the advertiser may access a webpage that allows the advertiser to select one or more keywords that the advertiser would like to be associated with, and thus presents an advertisement or link to an advertiser's website when the search service 111 receives one of the advertiser's selected keywords in a search query.

Exemplary Method Execution

Figure 2:
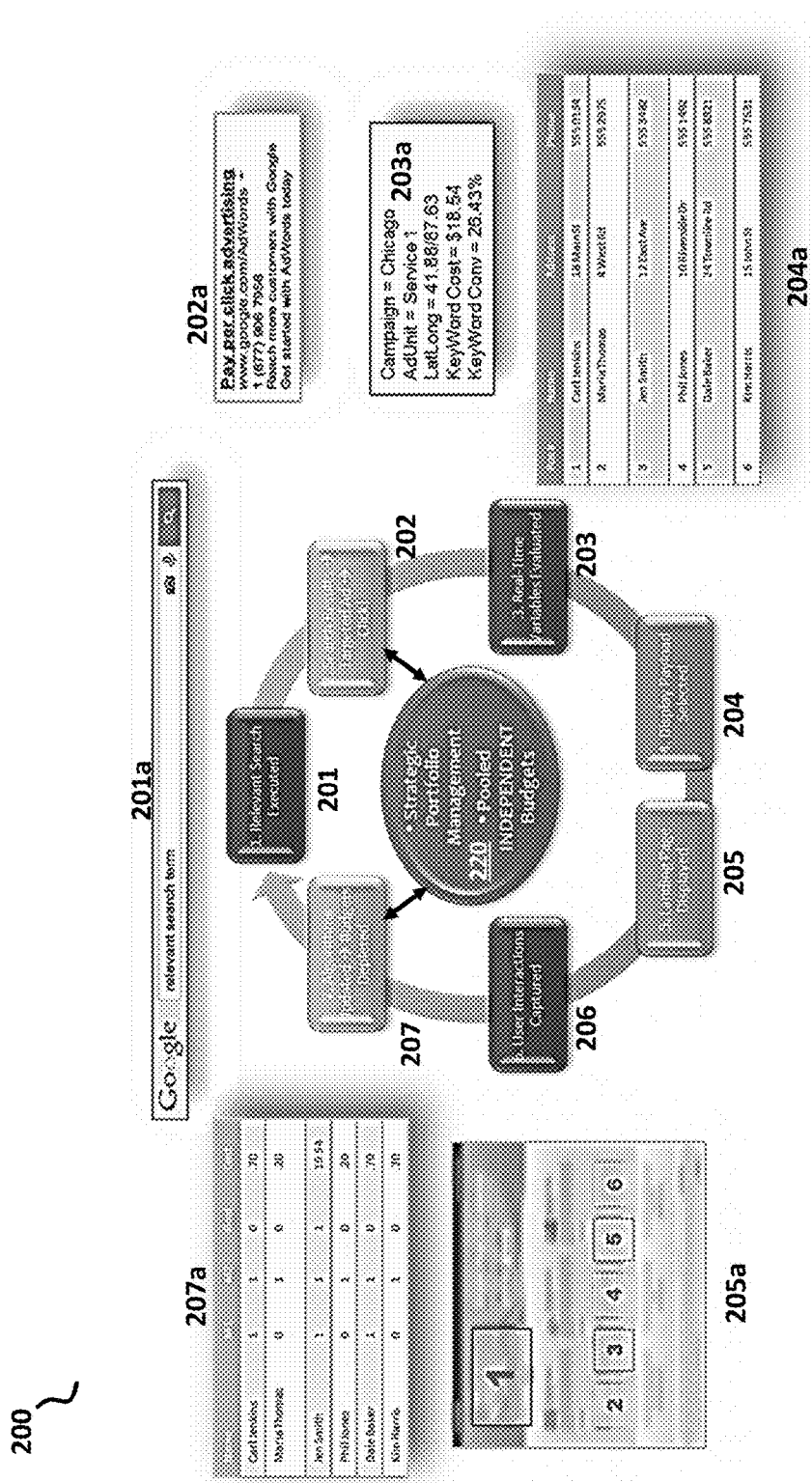
FIG. 2 is a diagram showing steps of execution, according to an exemplary method embodiment.

FIG. 2 shows steps of executing an exemplary method 200 embodiment. It should be appreciated that computing hardware performing varying embodiments of the method be executed by any number of computing devices that comprise a processor and non-transitory machine-readable storage media. FIG. 2 shows the various method steps 201, 202, 203, 204, 205, 206, 207 of the exemplary method 200, exemplary screen shots 201a, 202a, 205a of graphical user interfaces (GUIs) generated by computing devices, and exemplary sets of data 203a, 204a, 207a used or manipulated by computing devices.

In the exemplary method 200, an SEM service provides backend support to a corporate customer's webserver, which hosts a consumer-facing website. The customer's website provides consumers with information about certain employees who specialize in service delivery. As an example, the corporate customer may be an insurance company that allows local agents to open a franchise in one or more geographic regions. The website of the insurance company (i.e., corporate customer) may allow consumers to search for local agents, or agents who specialize in a particular insurance product, or both. The SEM service may provide one or more application programming interfaces (APIs) to the webserver, which may be code modules that allow the servers of the SEM service to dynamically generate information to be displayed on template-based webpages of the corporate customer's webserver. Thus, in this exemplary method 200, the web server remains within the administrative control of the corporate customer, but may dynamically communicate data with the SEM servers, which are external to the corporate customer's network. For example, the APIs may provide instructions to the webserver on gathering data produced from monitoring a website visitor's interactions with a dynamically produced landing page presented by the webserver.

Although the description of the exemplary method 200 provides examples in terms of an insurance company, its franchised sales agents, and consumers/visitors, one having ordinary skill in the art would appreciate that possible embodiments of the systems and methods described herein are not limited to such implementations or scenarios.

In a first step 201, a consumer performs a search using a search service with which an ad unit has been registered, and associated with a keyword. The consumer may visit a website hosted by servers of a search service, such as Google® or Bing®, and enter a search query into a prompt or data input field, such as a text box 201a. The query may be transmitted to a search service server, which may execute the search according to various algorithms of the search service. If the query entered by the consumer contains keywords associated with the portfolio, then the search service may return the ad unit 202a registered for that keyword in a set of search results, or otherwise present the ad unit 202a, through a GUI of a software application, such as a web browser.

An ad unit 202a may be a hyperlink, graphic, text, multimedia graphic, or other GUI component that may be displayed to the consumer with a set of search results. In the systems and methods described herein, ad units 202a may direct the consumer's computing device (e.g., workstation PC, server, tablet, mobile phone) to a landing page 205a associated with participants of a joint-advertising effort, which may capitalize on a portfolio of funds and keywords. In the exemplary method 200, the landing page 205a may be associated with a corporate customer of the SEM service, where the participants to the portfolio may be sales agents or employees responsible for service delivery. The corporate customer or the participants of the portfolio may register ad units 202a with the service, such that the ad units 202a may be associated with the registered keywords. When a consumer, whose search contained a registered keyword, activates an ad unit 202a, the hyperlink underlying the ad unit 202a redirects the consumer's device to a URL associated with the landing page 205a associated with the participants of the portfolio.

In a next step 202, after performing the search according to the search service's algorithms, the search service's search results may be presented, through a GUI, to the consumer's computing device (e.g., workstation PC, laptop, mobile phone, tablet). The GUI may display a set of search results and a set of advertising links. In some cases, a hyperlink that directs the consumer device to the URL of a landing page 205a, may be presented in the organic search results of the search service. In some cases, the ad unit 202a may be presented in the GUI along with the search results, but not necessarily as part of the organic search results. In the exemplary method 200, the search results themselves do not contain a hyperlink to the landing page 205a. However, a keyword in the consumer's search query triggered the search service to present an associated ad unit 202a that links to the landing page 205a, because the ad unit 202a was registered with the search service as being associated with that keyword. In this example, the ad unit 202a may be displayed to the consumer within the same GUI as the search results, but independent of the search results. The consumer may then decide to click, or otherwise activate, the hyperlink underlying the graphical presentation of the ad unit 202a.

In a next step 203, server identifies marketing characteristics of the visitor, which are then used as variables 203a inputted into one or more algorithms to determine the appropriate content payload 204a to display for the visitor. After the consumer selects the ad unit 202a or other hyperlink, the consumer's computer may then be directed to the URL of the landing page 206a; accordingly, the consumer is considered a visitor of the corporate customer's web site. The web browser, or other application, on the visitor's computing device may then attempt to establish a connection with the corporate webserver using any number of known hardware and software protocols. The visitor's computing device may then request data, such as webpage html code or other instructions, from the webserver. The connection request received by the corporate webserver may trigger the corporate webserver to gather data about the visitor, which, in turn, may trigger the SEM service to dynamically generate payload content 204a for the landing page 206a being generated by the webserver.

As mentioned above, a set of variables 203a corresponding to characteristics of the visitor may be gathered by the webserver and then transmitted to the SEM servers, via SEM server APIs. The SEM servers may use the set of variables 203a to determine the appropriate content payload 204a to display on a landing page 205a. FIG. 2 shows pseudo-code representing a non-limiting exemplary set of variables 203a generated by the webserver; this exemplary set of variables 203a includes a campaign identifier, a referring ad unit 202a identifier, the geographic location (i.e., LatLong) of the visitor or visitor's Internet Service Provider (ISP), a predicted cost for the registered keyword that was searched by the search service (i.e., KeyWord Cost), and a predicted conversion rate for that keyword (i.e., KeyWord Cony.). It should be appreciated that the set of variables 203a shown in FIG. 2 is not intended to be exhaustive; others may be collected from any number of characteristics about visitors, and then used in various embodiments of the systems and methods described herein.

In some embodiments, such as the exemplary method 200, the set of variables 203a may include a predicted keyword cost and a predicted keyword conversion rate. The SEM service may determine these predicted values before the exemplary method 200 begins and/or during execution. In some embodiments, after an SEM server determines these predicted values, the values may be stored into a database that is hosted an SEM server. A predicted keyword cost may be the likely price-per-click for a searched keyword, based on historical data. A predicted keyword conversion rate may be the likelihood a consumer clicks on a link and visits a page when advertising with that particular keyword.

Payload content 204a may be determined based on a set of variables 203a corresponding to characteristics of the visitor, such as the geo-location of the visitor, the geo-location indicated for the search, the nature or market for a customer's service, the proportionate contribution of customers to a join-advertisement portfolio, the geo-location of a customer's market base, among other data. The landing page may be based on historic or predicted data related to the keywords registered by the portfolio; and, more specifically, the keyword entered in the search query by the visitor. This historic and predicted data related to keywords may be stored in a database hosted on an SEM server 210.

For example, the set of algorithms may gather information related to the visitor's geographic location and the ad unit 202a identifier the visitor clicked. The algorithms thus determine payload content 204a based on location (e.g., Chicago) and that the visitor just "consumed" ad unit #1 202a. SEM servers may predict that the keyword in this example would cost $18.50 per click and that the keyword was predicted to convert 26.4%, based on the historic data stored in a database of the SEM service. In this example, the payload content 204a may contain six participants to be shown and their respective ordering. This determination may be based on a number of variables, such as the predicted cost per click, the predicted conversion rate, past output traffic results for each participant, the participants' respective contributions to the portfolio budget, the location of the participants, and other variables.

In two display steps 204, 205, after the SEM servers select and/or generate the content payload 204a and then use the appropriate APIs to provide the content payload 204a to the corporate customer's webserver, the payload content 204a and the landing page 205a may then be displayed to the visitor through a GUI (e.g., web browser). That is, in a next step 204, after the SEM service has selected and generated the content payload 204a, the content payload 204a may be displayed as a part of the landing page concurrently generated by the webserver, and thus both may be displayed in a next step 205.

For a payload display step 204, after SEM servers automatically determine which payload content 204a to display on the landing page 205a, which may comprise various types of information related to the participants. The payload content 204a display may include hyperlinks, advertisements, or other information associated with the individual customers who are members or participants of a portfolio.

For a page display step 205, after the payload content 204a is communicated to the webserver, the webserver may generate a GUI to be displayed on the screen of the visitor's device, such as a webpage for a web browser, or a mobile app splash screen for a mobile app published by the SEM service. The webserver may store machine-readable template files, such as markup language files (e.g., HTML, WML), style sheets (e.g., CSS files), or other types of files that may be used organize and display content on the landing page 205a. The template files may automatically render the dynamic data provided with the payload content 204a, according to a predicable or persistent look-and-feel scheme (e.g., color, formatting, logos, fonts).

The landing page 205a may present the participants in accordance with the ordering determined for the payload content 204a. Templates may determine the look-and-feel and general aesthetic of the landing page. In this example, the landing page may be display a information regarding each participant in an order determined from the payload content 204a, based on a ranked position (Pos. #). As such, a first participant (Pos. #1), who is in the first position of the payload content 204a, may be placed at a prominent location (Box 1), which is more likely to drive output traffic to the first participant (Pos. #1).

In a next step 206, while the webserver is presenting the landing page 206a through a GUI of a software application, such as a web browser; the webserver may continuously gather visitor behavior data based on the interactions (e.g., mouse clicks, data inputs, selected ads or hyperlinks), which may be stored into database hosted on an SEM server 210.

In a next step 207, the collected data may be used as feedback by algorithms of the SEM service, to automatically update and hone the effectiveness that the servers select the payload content. In this step 207, the SEM service may automatically distribute costs to each of the participants of a portfolio. The feedback information may also be used to update data sets 207a of the portfolio participants to better determine the predicted keyword conversion rate, predicted keyword cost, and other historic data associated with the keyword, for the next time the payload content 204a needs to be generated for a landing page 205a.

In this step 207, the SEM service may distribute costs of advertising using the keyword, across the various portfolio members. That is, the aggregated portfolio budget 220 may be used (i.e. depleted) to pay the search service to register the "clicked" ad unit associated with the searched keyword. In cases where the search service charges on a per-click basis, the portfolio's bank account or search service account may be charged a certain amount of money by the search service. The SEM service may then distribute those costs. The feedback information captured from visitor interactions with the landing page may be used to update various data sets 207a and algorithms that help determine how to proportionately distribute costs associated with advertising with the keyword.

It should be appreciated that the particular order in which each step of the exemplary method 200 is merely one example and, as such, it is contemplated that other embodiments may execute the steps in a different order, execute additional steps, or reduce the number of steps performed. One having ordinary skill in the art would therefore appreciate that varying the steps of performing this or any other embodiment, may fall within the scope of the subject matter disclosed herein.

In some embodiments, the way in which the system may capture event data and debit (i.e., allocate costs to participant budgets) may vary. For example, in some embodiments, a session identifier (session ID) may be generated for a portfolio invoice file that tracks line items of predetermined events. The system may track predetermined actions or events, and when such actions/events occur, it becomes a line item in an invoice file with a calculated value. The invoice file allows the system to capture a latent conversion (e.g., a phone call that comes in hours after the session expires), which may allow the system to process a transaction as a credit note against that session ID. The may then adjust each participant's contribution, among other metrics, based on the presence of the new conversion event data, now generated in the invoice file associated with the portfolio of participants.

Exemplary System Embodiment

Figure 3:
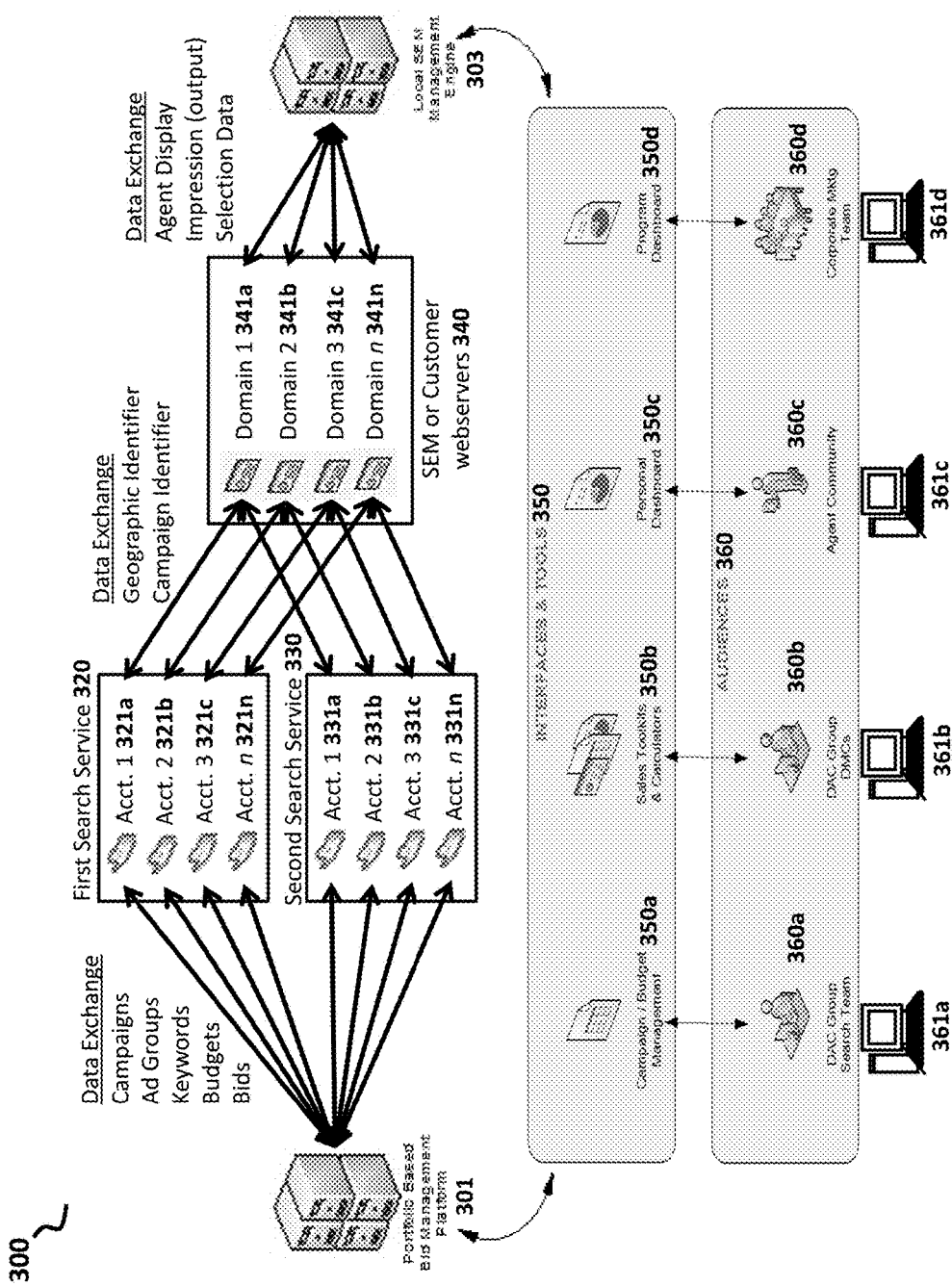
FIG. 3 is a diagram showing components of an exemplary system, and exemplary data flow between various components of the system.

FIG. 3 shows components and dataflow in an exemplary system 300 embodiment. The exemplary system 300 may comprise SEM servers 301, 303, 340, end-user devices 361, and search services 320, 330. The SEM servers may include one or more servers executing bid management platform software (bid platform 301), one or more servers executing local SEM management engine software (SEM engine 303), and one or more servers executing webserver software (webserver 340). End-user devices 361 may be computing devices that have varied functionality based on the audiences 360 of the users who are associated with each particular end-user device 361.

Interfaces and Tools, and End-User Devices

An SEM service may provide users with various interfaces and tools 350 for managing aspects of the SEM service. In some embodiments, these interfaces and tools 350 may software modules hosted by SEM servers 301, 303, 340, and may be accessed by end-user devices 361 through a web browser. For example, the interfaces and tools 350 may be web-based service accessible via an end-user device's 361 web browser application. As such, the interfaces and tools 350 may be hosted on a bid management platform 301, management engine 303, or webserver 340. In some embodiments, the software modules of the interfaces and tools 350 may be downloaded to the end-user devices 361. The interfaces and tools available to the end-user devices 361 may vary based on the audience 360 of the user who is associated with a particular end-user device 361.

As an example, personnel of the SEM service 360a, 360b, such as an advertisement portfolio manager 360a and a SEM search analysts 360b, may have access to different interfaces and tools 350 than the interfaces and tools 350 that are available to participants of the portfolio (participants 360c) and corporate marketing teams 360d. The interfaces and tools 350 may be used by various user audiences 360 to query and manipulate data stored in an SEM database (not shown) or other storage media that is housed in the SEM servers 301, 303, 340.

In the exemplary system 300, interfaces and tools 350 may include campaign and budget management tools 350a, sales toolkits and calculators 350b, personal dashboards 350c, and program dashboards 350d. Portfolio managers 360a may have access to the campaign and budget information tools 350a, which may be used for reviewing effectiveness and budgeting for a one or more portfolios. SEM search analysts 360b may have access to sales toolkits and calculators 350b, which may be used for reviewing analytics data to identify useful marketing trends for the SEM service, customers, and portfolio participants 360c. Participants 360c (e.g., small-business owners, insurance agents, franchisees) may have access to a personal dashboard 350c, which may provide a participant 360c with information about their personal contributions to a portfolio and the marketing output (i.e., return on investment) generated from participating in the portfolio. Members of a corporate marketing team 360 may have access to a program dashboard 350d, which they may use to review the effectiveness of one or more campaigns, portfolios, participants 360c, or other performance metrics. The program dashboard 350d may also be used by member 360d to manage the various features of the system 300, so that the corporate customer's campaigns and portfolios may be tailored to the preferences of the corporate marketing team 350d.

Advertisement Portfolio Managers, Campaign/Budget Management Tools

Advertisement portfolio managers 360a may access campaign and budget management 350a tools, which may used for purchasing advertising with search services 320, 330. In some embodiments, the campaign and budget management tools 350a may have access to accounts owned or otherwise associated with corporate customers, portfolios, and individual participants 360c. But in some embodiments, the campaign and budget management tools 350a may be limited in the scope of data they can retrieve or otherwise view about various accounts.

In the exemplary system 300, advertisement portfolio managers 360a may use campaign and budget management 350a tools to manage various accounts, and these accounts may include banking accounts of participants 350c, banking accounts of groups of participants 350c (i.e., portfolios), and/or banking accounts of corporate customers. The accounts managed by the advertisement portfolio managers 360a using the campaign and budget management 350a tools, may also include search service accounts 321, 331 of participants 350c, and search service accounts 321, 331 of portfolios. Search services 320, 330 often require advertisers to register for an account with the search service 321, 331. This way, the search services 320, 330 may track which keywords have been associated with which advertisers. When advertisers register for various keywords, the search service 321, 331 associated that keyword the advertisers' accounts 321, 331. In some cases, search services 320, 320 may invoice and receive payment from advertisers through their accounts 321, 331.

In some embodiments, campaign and budget management 350a tools may limit the visibility into participants 360c of a portfolio. Advertisement portfolio managers 360a may use the campaign and budget management 350a tools to buy the advertising (i.e., register ad units with keywords) for portfolio accounts 321, 331 at a macro-level. For example, the campaign and budget management 350a tools may allow an advertisement portfolio manager 360a to see that a corporate bank account for a multi jurisdictional campaign holds $1.2 million to spend on auto insurance advertising in Illinois and $800,000 to spend on auto insurance advertising in Ohio. In this example, however, the campaign and budget management 350a tools prohibit the advertisement portfolio manager 360a from viewing any details about, e.g., portfolios of the campaign (e.g., how many portfolios), portfolio participants 360c (e.g., how many participants 360c, identities of participants 360c), or both.

In some implementations, advertisement portfolio managers 360a may be provided with instructions and related data, to advertise for a set of services, in one or more geographic constraints, using a certain amount of money. In the exemplary system 300, the advertisement portfolio managers 360a may use metrics gathered and analyzed by the campaign and budget management 350a tools, to develop effective macro-level campaigns. In some cases, these determinations may be based on data gathered by the various devices and software modules of the system 300, and which may be stored in a database of the SEM service. In some implementations, SEM search analysts 360b may access and operate toolkits and calculators 350b that may be used to interpret "landing page" traffic generated as a result of the advertisement portfolio managers' 360a efforts to purchase appropriate keywords on behalf of campaign portfolios. SEM search analysts 360b may benefit from the software-based toolkits and calculators 350b, to revise algorithms and variables that may be used to develop certain metrics (e.g., predicted keyword costs, predicted keyword conversion rates). Moreover, the toolkits and calculators 350b used by the SEM search analysts 360b may be used to distribute search service 320, 330 costs equitably among participants 360c.

It should be appreciated that the segmentation of duties and the partitioning of features described herein are not to be construed as a required limitation for practicing the various systems and methods disclosed herein. The segmentation and partitioning described herein may provide any number of benefits and/or drawbacks, all of which may be based on business considerations. Other embodiments may not implement similar segmentation or partitioning, or other embodiments may implement different segmentation or partitioning.

SEM Search Analysts, Sales Toolkits and Calculators

SEM search analysts 360b may access and operate toolkits and calculators 350b to solicit corporate customers for the SEM service, or solicit participants 360b to participate in a joint-advertising campaign. In some embodiments, an analyst's 360b computing device 361b may access cloud-based sales toolkits and calculators 350b. In some embodiments, the analyst's 360b computing device 361c may download a software application or mobile application to locally provide the analyst 360b with various features and functions of sales toolkits and calculators 350b, as described herein.

Analysts 360b may use the toolkits and calculators 350b to develop useful metrics and criteria for grouping participants 360c into mutually-beneficial portfolios. This may be done by generating useful groups based on criteria that may entice individuals to become participants 360c to a mutually-beneficial advertising portfolio, such as common characteristics (e.g., geographic market, common competition).

The software-based toolkits and calculators 350b may be used to interpret "landing page" traffic that may be generated as a result of the advertisement portfolio managers' 360a efforts in purchasing appropriate keywords on behalf of campaign portfolios. Analysts 360b may benefit from manual and automated processes of the toolkits and calculators 350b, to revise algorithms and variables used to develop certain metrics (e.g., predicted keyword costs, predicted keyword conversion rates). In other words, the toolkits and calculators 350b may ingest data gathered from monitoring a visitor's interaction with a landing page, and then use that gathered data to adjust formulas and variables used by the system 300.

Automated or manual processes of the toolkits and calculators 350b may be used to distribute search service 320, 330 costs equitably among participants 360c of a portfolio. The toolkits and calculators 350b may use any number of variables (e.g., contribution share, predicted word costs) to determine each participant's 360c proportionate obligation.

As an example, an analyst 360b may use his or her toolkits and calculators 350b interface to organize 1,000 different participants 360c and their individual budgets, in such a way that the participants 360c may most effectively sell, e.g., insurance products in certain markets. Participants 360c may input a number of preferences and other descriptive information, which may indicate, e.g., the type or types of insurance each respective participant 360c would like to advertise for in a given market. Participants 360c may be presented on their personal dashboard 350c various GUI interfaces that allow participants 360c to enter this descriptive information, which the toolkits and calculators 350b may use to build a profile of that participant 360c. Thus, by interacting with various macro-level inputs, the participants 360c help the toolkits and calculators to automatically develop individual profiles. For example, one participant 360c may enter information indicating that he or she is interested in selling home, auto, and life insurance products throughout Illinois. Analysts 350b may use the toolkits and calculators 350b to assemble various groups that may be used to define possible portfolios, such as groups of participants and/or groups of money. In some implementations, advertisement portfolio managers 360a, who buy all the advertising on behalf of the portfolios or campaigns, may be prohibited from having visibility into the groupings of participants 360c and funds, according to predetermined configurations of the campaign and budget management 350a tools. That is because the campaign and budget management 350a tools may be configured to focus on the roles of the advertisement portfolio managers 360a: developing efficient and effective macro level campaigns. The analysts 350b may interpret the resulting traffic to generate better algorithms to better distribute costs equitably and fairly among the participants 360c.

Participants, Personal Dashboards

Participants 360c may access a personal dashboard 350c when they initially join a portfolio. In some embodiments, their device 361c may access a cloud-based personal dashboard 350c tool. In some embodiments, their device 361c may download a software application or mobile application to locally provide participants 360c with the features of the personal dashboard 350c. The personal dashboard 350c may aid the participant 360c to manage their personal interest, contributions, and involvement in one or more joint-advertising portfolios. As such, the personal dashboard 350c may be customized for each individual participant 360c, based certain variables the participants 360c.

In some embodiments, personal dashboards 350c of participants 360c may have a common look-and-feel, based on the specifications provided from the marketing team 360d of a corporate customer, however the information of each respective personal dashboard 350c may be presented with personalized information relevant to each participant 360c. The personalized information of each participant 360c may be based on a number of inputs received from the participant 360, and, in some embodiments, data that is automatically derived by the SEM servers 301, 303, 340 through the course of service delivery to the participant 360c. Information about each participant 360c may be stored as a record of the participant 360c into a database hosted by one or more SEM servers 301, 303, 340. Non-limiting examples of the data fields of participant records may include: name, location, geographic market or markets, business goals, motivating factors, products, targets, timelines, deadlines, among other strategic and tactical considerations used for establishing an effective marketing campaign. The participant records may also contain an indication for the amount of money the participant 360c has pledged, contributed, or otherwise budgeted, to a portfolio. Using the personal dashboard 350c, the participant 360c may input and update the participant information to the SEM service. In some embodiments, at the time the participant 360c initially signs up to a portfolio, the participant 360c may be provided with a input form requesting the participant information needed to complete, or, at least, initialize a participant record.

As an example, a local sales agent for an insurance company may agree to be a participant 360c to the insurance company's joint-advertising effort. The participant 360c (i.e., insurance sales agent) may be provided with login credentials to access a cloud-based personal dashboard 350c. Upon initial access to the personal dashboard 350c, the participant 360c is provided with a questionnaire, which may be an HTML-based form containing a series of questions that are used to determine which of the company's portfolios the participant 360c should join. In this example, the participant 360c may be Illinois-licensed insurance agent who is interested in selling a threshold amount of life insurance, because the participant 360c wants a bonus that is paid to agents who sell the threshold amount in a given year. Accordingly, the participant 360c inputs his name ("Jane Doe"), location ("Chicago"), geographic market ("Illinois"), timeline (this corporate fiscal year), deadline ("December 30"), product ("life insurance"). The participant 360c may also input the amount she wishes to contribute to the portfolio budget, and the frequency at which she wishes to contribute (e.g., daily, weekly, bi-weekly, monthly, annually). A record of the participant 360c may then be generated and stored into the SEM database, hosted on one or more of the SEM servers 301, 303, 340.

Corporate Marketing Team, Program Dashboards

Members of a corporate marketing team 360d may access a program dashboard 350d, which may be generated when the corporation initially signs up to be customer of the SEM service. SEM service personnel 360a, 360b, such as portfolio managers 360a and search analysts 360b, may work with the corporate marketing team 360d to determine which features should be available on the program dashboard 350d, and in some implementations, determine various aspects (e.g., look-and-feel) and features for the personal dashboards 350c of the portfolio participants 360c. Members of the corporate marketing team 360d may operate their own corporate device 361c, to access the program dashboard 350d tool. In some embodiments, the program dashboard 350d may be a cloud-based interface; and in some embodiments, corporate devices 361d may download a software application or mobile application that locally provides members of the corporate marketing team 360d with the features of the program dashboard 350d, on their corporate device 361d.

A program dashboard 350d may allow members of the corporate marketing team 360d to manage the performance and execution of a joint-advertising program. For example, the members 360d may determine how new participants 360c are solicited to join a portfolio, how new portfolios are generated (e.g., criteria for grouping participants 360c), which personal dashboard 350c features are provided to participants 360c, or members 360d may design a common look-and-feel across participants' 360d personal dashboards 350c to maintain common branding and features. In some embodiments, the features and managerial controls of the program dashboard 350d may be based on the specifications provided from the marketing team 360d of the corporate customer.

In some embodiments, a program dashboard 361d may provide the corporate customer with high-level insight into the various markets, by presenting a number of analytics tools and results for the amount of traffic generated for each portfolio, of one or more campaigns. Corporate market teams 360d may be able to get insight into how well the campaign is performing, at a macro-level. The program dashboard 361d may present the information needed to organize, run, and adjust the campaign. The program dashboard 316d might show, for example, how much money the corporate customer or the participants 360c should be spending advertising budgets on which services in a market.

Portfolio-Based Bid Management Platform

A bid platform 301 may be a computing application of the SEM service, and may be hosted on any number of computing devices that comprise a processor and are capable of performing the various tasks and processes described herein. The bid platform 301 may communicate data associated with keywords and ad units with the search services 320, 330. That is, the bid platform 301 may receive instructions from interfaces and tools 350 regarding the appropriate keywords for each portfolio or campaign. The bid platform 301 may determine which keywords the customers 360c, 360d wish to pay for, or bid on in a competitive setting, to have the privilege of associating an ad unit with each of the desired keywords. The bid platform 301 may also be responsible for executing any number of financial transactions associated with portfolios.

In some embodiments, campaign and budget management 350a tools may develop a data model governing participants 360c, across one or more portfolios of a campaign. After solicited participants 360c have opted to join the campaign, their inputted data may be stored into a database (not shown) as a participation record, and the participation records may be used to update the data model. A corporate marketing team 360d may indicate a set of categories for segmenting participants 360c based on one or more characteristics, which may be captured during the new participant 360c sign up process. In some embodiments, the bid platform 301 may execute a grouping engine that may automatically analyze participation records of participants 360c, which may then generate groups of participants 360c for one or more portfolios of a campaign. In such embodiments, the grouping engine may identify a group of participants 360c based on a set of variables determined by preset templates that the SEM service provides to its corporate customers. Additionally or alternatively, the variables may be determined by members of a marketing team 360d, advertisement portfolio mangers 360a, or search analysts 360b. The variables may be data points corresponding to characteristics about participants 360c, which may be captured from interactions with a landing page, URL variables, or participation records. It should be appreciated that, in some embodiments, the grouping engine functions may be executed or updated by an SEM engine 303.

In some embodiments, data models may be developed using participation records, which may be database records containing records of each participant 360c. When a person registers with the SEM service as a participant 360c, this new participant 360c may input their information into a personal dashboard 350c questionnaire. The participant's 360c inputted data is then stored into a database (not shown) as a participation record, which is accessible to the bid platform 301 and campaign and management tools 350a.

As an example, an insurance company may provide an SEM service with a set of 88,000 possible participants 360c. The various categories for participants 360c may be based on characteristics that correspond to one or more macro-level variables, as indicated by the advertising portfolio managers 360a, corporate marketing team 360d, or other person providing instructions and data manipulating performance of the data models and the bid platform 301. In this example, the marketing team 360d may use a program dashboard 350d to indicate that participants 360c and portfolios should be categorized based on, e.g., insurance products that participants 360c want to push to consumers. In this example, the data model may comprise four major categories of service (e.g., home insurance, life insurance, auto insurance, the insurance company's banking product). The campaign and budget management tools 350a may use these categories and data model to determine the effective keyword advertising strategies, such as which keywords to register with ad units and which geographic markets should be targeted. In some embodiments, the bid platform 301 may use the data model to purchase keyword advertising privileges with search services 320, 330.

Webservers and the Landing Page

A webserver 340 may be computing service hosted on one or more computing devices of the system 300, and may be configured to host webpages associated with a domain 341. In some embodiments, the webserver 340 is the property, or resides in the internal network of a corporate customer. In some embodiments, the webserver 340 may be the property of the SEM service, and may reside in the internal network of the SEM service. In such embodiments, as in the exemplary system 300, the webserver 340 may be hosted on one or more SEM servers 301, 303, 340. The webserver 340 may store templates and code scripts for generating landing pages dynamically, based on a set of variables captured at the time a landing page visitor is directed to the URL of a particular domain 341.

A domain 341 may be a registered address that represents an IP address for a particular webserver's externally facing resources, such as webpages or multimedia downloads. A URL may be a data string that instructs a computing device to access the resources provided by the domain. One having ordinary skill in the art would appreciate that a webserver 340 may host any number of domains 341, and therefore may host any number of websites. In some implementations, a domain 341 may be registered and hosted by a corporate customer or third-party service, on a webserver 340 belonging to the corporate customer or third-party service. In some implementations, a domain 341 may be registered and hosted by the SEM service, on a webserver 340 of the SEM service.

A webserver 340 may be communicate data with a server executing a local SEM management engine (SEM engine 303), which may provide the webserver 340 with payload content to be presented on a landing page. That is, the webserver 340 may merely store skeletal aspects of a landing page, such as formatting templates and graphics. However, actual meaningful information (i.e., the information sought by the visitor) may be found in the payload content, which is dynamically generated and provided by the SEM engine 303. This payload content may be passed between the SEM engine 303 and the webserver 340 using various APIs associated with the SEM service and SEM engine 303.

In some embodiments, webserver 340 may render the landing page using various a JavaScript services that may programmatically populate that payload of data from the SEM engine 303. Further, the SEM engine 303 may provide APIs and scripts to the webserver 340 that enable the webserver 340 to monitor a visitor's interactions with the landing page and gather that data, which may then be stored in databases of the SEM service and later used to revise the algorithms of the system 300. The SEM engine 303 may execute a scripts, such as a JavaScript, which may be executed when the webserver 340 requests the payload content to fill out the landing page. The SEM engine 303 may return the payload content in any format useable by the scripts of the webserver 340, such as a JSON format. Further, the webserver 340 generating the landing page may execute another script library that may enable the real-time collection of all the interactions that the visitor has with the landing page (e.g., mouse clicks, mouse hovers, screen touches, time spent reviewing the page). The interactions gathered from the visitor may be collected using the JavaScript.

In some embodiments, visitors may contact a participant 360c listed on a landing page using a telephony technology, which may be launched from the landing page. In such embodiments, the webserver 340 may communicate with one or more VoIP servers (not shown) to monitor and capture these interactions. Thus, the webserver 340 may identify whether the visitor has telephoned, or otherwise contacted, a participant 360c based on the landing page, as though the visitor had clicked on a hyperlink associated with the participant 360c. The data gathered as a result of detecting the phone call may be gathered and tracked as an output benefiting that particular participant 360c, since the landing page successfully drove consumer traffic to the participant 360c. In some embodiments, participants 360c may establish output and/or business goal expectations, which may be stored into a participation record and used to determine the effectiveness of the portfolio, metrics, and algorithms employed for that participant 360c. The participant 360c may also reference the output data from their personal dashboard 350c as a means of determining their return on investment derived from participating in the joint-advertising portfolio and campaign. Outputs may include instances where consumer traffic is driven to the participant 360c as a result of the landing page, such as mouse clicks and phone calls. The output information and interaction data may be transmitted to the SEM engine 303 for processing and may be stored into a database (not shown) of the SEM service. In some cases, this information may be made available to various interfaces and tools 350 of the system 300, which may allow users to review the data and further data processing. For example, campaign and budget management tools 350a may review and revise the interactions to determine the effectiveness of the purchased keywords at each of the search services 320, 330.

Local SEM Management Engine

An SEM management engine 303 may be a computing service of the SEM service hosted on any number computing devices that comprise a processor and are capable of performing the various tasks and processes described herein. The SEM management engine 303 may communicate with software-based interfaces and tools 350 hosted on any number of SEM servers 301, 303, 340. The SEM management engine 303 may receive instructions or other forms of data, such as participant records, from the interfaces and tools 350, which the SEM management engine 303 uses to execute its various functions.

In some embodiments, the SEM engine 303 may execute a grouping engine that may automatically analyze participation records of participants 360*c*, which may then generate groups of participants 360*c* for one or more portfolios of a campaign. In such embodiments, the grouping engine may identify a group of participants 360*c* based on a set of variables determined by preset templates that the SEM service provides to its corporate customers. Additionally or alternatively, the variables may be determined by members of a marketing team 360*d*, advertisement portfolio mangers 360*a*, or search analysts 360*b*. The variables may be data points corresponding to characteristics about participants 360*c*, which may be captured from interactions with a landing page, URL variables, or participation records. It should be appreciated that, in some embodiments, the functions of the grouping engine functions may be executed or updated by a bid platform 301.

In some embodiments, the SEM engine 303 may determine how search service 320, 330 costs should be distributed across participants of a portfolio. For example, the SEM engine will determent that a first participant 360*c* has contributed about 10 times the amount of money to a portfolio's bank account or search service account 321, 331 as compared to a second participant 360*c*, and thus the first participant 360*c* should theoretically receive roughly 10 times the beneficial output from participating in the portfolio. Using historic data about a keyword, the SEM engine 303 may determine the predicted cost of traffic being sent to the landing page by the search service 320, 330, based on the historic costs of associating the ad unit with the keyword, which may be registered with the search service 320, 330. That is, if a visitor arrives at the landing page, a keyword predicted to cost $80 per click may be charged a banking account of the portfolio or search services account 321, 331 of the portfolio. The SEM engine may then determine how that $80 should be proportionately across the participants 360*c* of the portfolio.

Output may be contact points that participants 360*c* receive from visitors who are directed to the landing page from the search results GUI of a search service 321, 331. Examples of output may include visitors clicking on a hyperlink to a participant's 360*c* website, visitors calling a participant's 360*c* phone number that is listed on the landing page, visitors clicking on an email link to request more information from the participant 360*c*, and the like. Output may be defined for the SEM engine 303 in a number of ways; in some implementations, the output metric may be defined according to specifications provided to the SEM service by a corporate marketing team 360*d* and/or participants 360*c*. Members of a corporate marketing team 360*d* may, for example, use a program dashboard 361*d* to select the types of contact points that would constitute output generated by a landing page. Participants 360*c* may, for example, use a personal dashboard 361*c* to select the types of contact points that would constitute output. In some embodiments, based on the data inputted by a participant and stored in a participation record, the SEM engine 303 may, on behalf of the participant 360*c*, automatically determine the types of contact points that should be considered output. In some implementations, the SEM employees 360*a*, 360*b* may define what types of contact points constitute output, in the administration of the campaign.

Output may be automatically or manually determined according to participant 360*c* goals, which may be weighted in levels of importance. The SEM engine 303 may track and analyze visitor interactions and content interests on a landing page, and then implement real-time learning (i.e., algorithm revisions) to determine which participants 360*c* of the portfolio, and in what order, should be displayed the next time the landing page is to be displayed to a visitor.

Similar to automated updating processes of the bid platform 301, which may analyze and update various algorithms, formulas, and variables implemented during bid platform 301 functions (e.g., purchasing keywords, defining categories), the SEM engine 303 may similarly execute various automated updating processes. The SEM engine 303 may analyze interaction data received from the webserver 340; and in some cases, the SEM engine 303 may receive updated instructions (e.g., new distribution criteria, revised set of participants 360*c* to a portfolio) from the interfaces and tools 350 of the system 300. The SEM engine 303 may analyze the received interaction data and/or instructions and automatically analyze and update the various algorithms, formulas, and variables implemented during SEM engine 303 functions (e.g., determining payload content for landing page, determining proportional distribution of costs charged to participants 360*c*).

Figure 4:
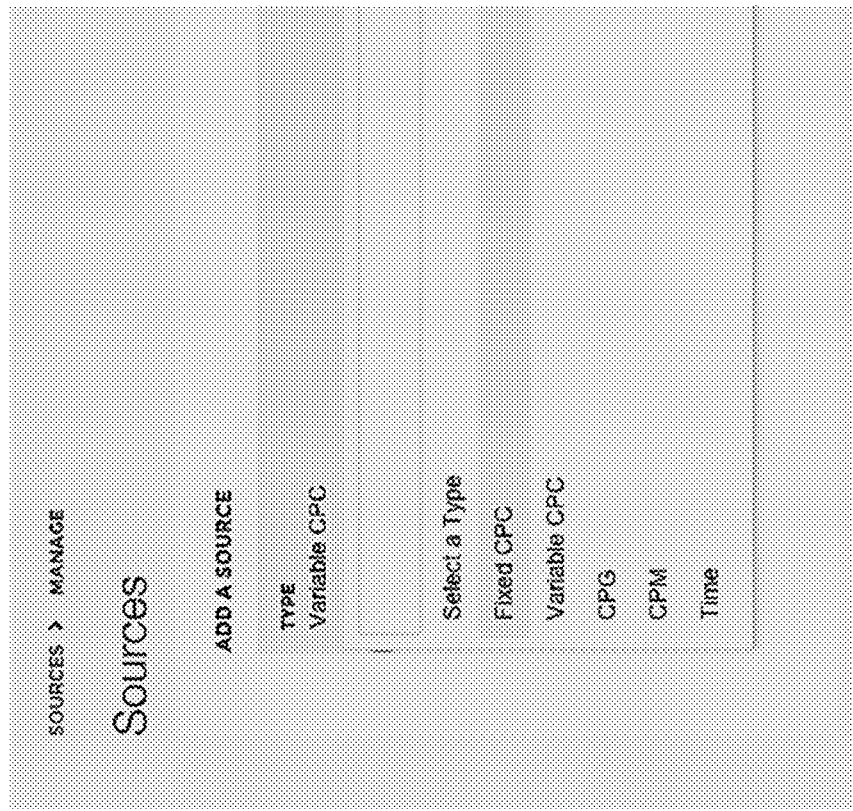
FIG. 4 shows a screenshot of a system administrator graphical user interface GUI, used for managing various aspects of an exemplary system.

FIG. 4 shows a screenshot of a system administrator graphical user interface GUI 400, used for managing various aspects of an exemplary system. As shown in FIG. 4, an administrator of the allocation platform system or a user associated with a participant may log into the system, to manage the various types of sources that the system may monitor for consumer behavior information. That is, using the GUI 400, users may identify which sources the allocation system collects behavior data from, to manipulate how the allocation system determines the presentation of participant marketing materials and allocation of marketing costs to each participant.

Figure 5:
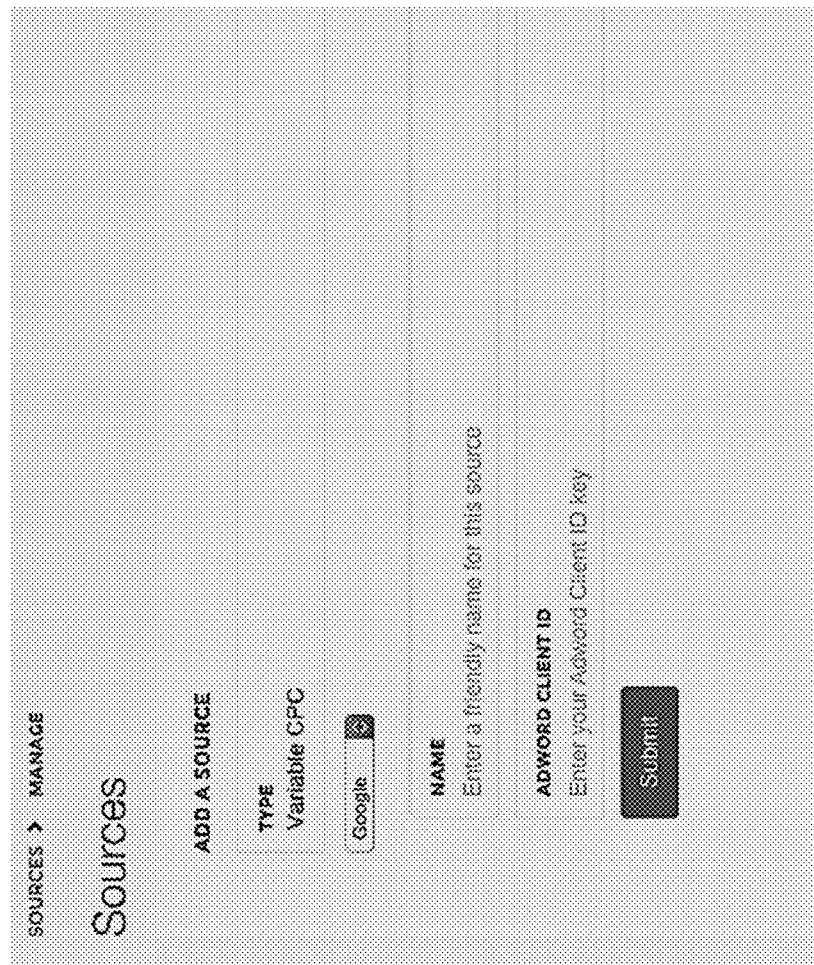
FIG. 5 shows a screenshot of a system administrator graphical user interface GUI, used for managing various aspects of an exemplary system.

FIG. 5 shows a screenshot of a system administrator graphical user interface GUI 500, used for managing various aspects of an exemplary system. Similar to FIG. 4, the GUI 500 of FIG. 5 shows how users may input particular details related to sources, which the user previously indicated should be monitored by the allocation platform system. The user may indicate a common name for the source and the participant's particular login credentials for accessing that particular source. For example, if a user indicated that a source, such as a cost-per-click (CPC) search service, should be monitored by the system, then the GUI 500 may prompt the user for a "friendly" name or identifier for the source, and then the participant's login credentials (e.g., Google Adword® Client ID). The platform system may then use the source's APIs and the credentials provided by the user to authenticate the system with the source, and thus access the participant's account held with the particular source.

Figure 6:
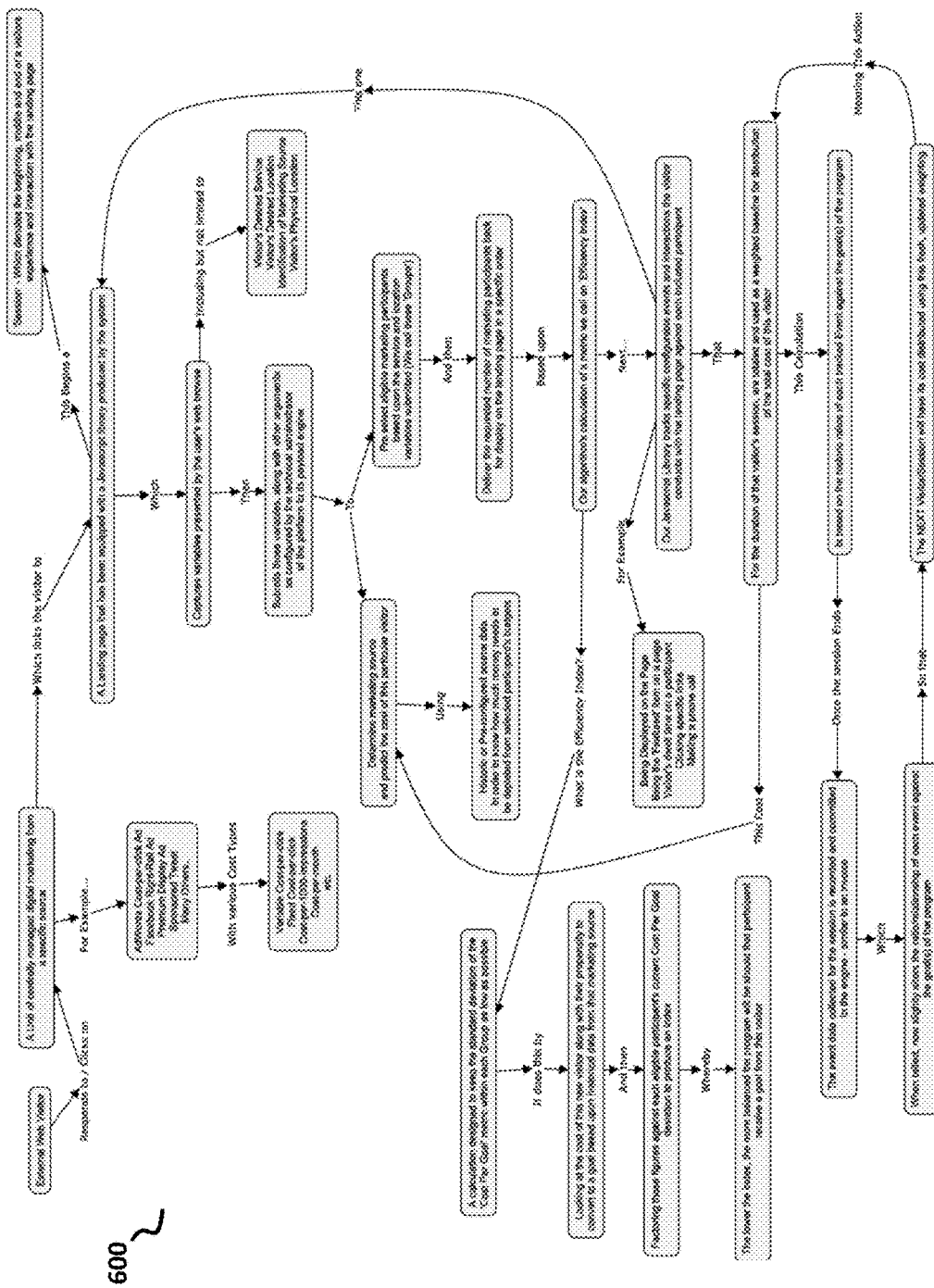
FIG. 6 shows a flowchart of execution of an exemplary embodiment.

FIG. 6 shows a flowchart of execution of an exemplary embodiment.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for targeted content presentation based on search query analysis and dynamic provisioning of extension numbers to phone numbers, the method comprising:
    in response to an activation of a hyperlink underlying a graphical presentation of a content unit in a search result page that (1) was dynamically output by a first network server and (2) comprises a plurality of search results associated with the content unit based on a search query submitted via a client computer associated with the activation:
        receiving, by a second network server, over a wide area network, a request from the client computer based on the activation, wherein the request requests a landing page from the second network server to be presented in a browser running on an operating system of the client computer;
        identifying, by the second network server, a characteristic of the client computer based on the request;
        sending, by the second network server, over the wide area network, the characteristic to an application server;
    in response to receiving, by the application server, over the network, the characteristic:
        accessing, by the application server, a database storing a plurality of records, wherein each of the records contains a service provider identifier associated with the content unit and a plurality of preference values associated with the service provider identifier;
        determining, by the application server, a content payload based on the characteristic and the preference values;
        generating, by the application server, the content payload such that the content payload is associated with at least two of the service provider identifiers, wherein at least one of:
            (a) the content payload is generated based on an apportioning engine using clickstream data collected from the client computer to determine how much value to deplete from each account associated with the at least two service provider identifiers involved in each content payload, wherein the apportioning engine generates the content payload based on an equation, wherein the equation includes $$WP(p) = \sum_{\varepsilon}^{e} \left\{ p(\text{count}[e]\text{this session}) \times \frac{G(\text{total}[\text{goals}])}{G(\text{total}[e])} \right\} +$$

$$C(\text{goal weight}) \times p\left( \begin{array}{c} \text{total}[\text{goals}] \\ \text{this session} \end{array} \right)$$

$$\text{Cost}(p) = X(\text{visit cost}) \times \frac{WP(p)}{\sum_{P}^{p} WP(p)}$$

or;

(b) the generating is based on an efficiency index which enables a sort of the service provider identifiers for a session associated with the presenting, wherein the sort sorts into an order which enables a maintenance of a lowest possible standard deviation of value-per-goal for the service provider identifiers, wherein the efficiency index selects the content payload of the at least two service provider identifiers to be populated on the landing page that has been requested by the client computer, wherein the efficiency index selects the content payload for the at least two of the service provider identifiers based on an equation, wherein the equation includes $$Ef(p) = C(\text{spend bias}) \times \left[ \frac{\frac{p(\text{amt spent})}{p(\text{budget})} - \frac{\sum_{p}^{P} p(\text{amt spent})}{\sum_{p}^{P} p(\text{budget})}}{\frac{\sum_{p}^{P} p(\text{amt spent})}{\sum_{p}^{P} p(\text{budget})}} \right] +$$

$$100 \times C(CPG \text{ bias}) \times \left\{ \frac{\frac{p(\text{amt spent})}{p(\text{goal count})}\left[1 + p\left(\begin{array}{c}\text{performance}\\\text{advantage}\end{array}\right)\right] - \frac{\sum_{p}^{P}\left[\frac{p(\text{amt spent})}{p(\text{goal count})}\left[1 + p\left(\begin{array}{c}\text{performance}\\\text{advantage}\end{array}\right)\right]\right]}{G(\text{participation count})}}{\frac{\sum_{p}^{P}\left[\frac{p(\text{amt spent})}{p(\text{goal count})}\left[1 + p\left(\begin{array}{c}\text{perf}\\\text{adv}\end{array}\right)\right]\right]}{G(\text{participation count})}} \right\};$$

$$- \left[ \frac{X\left(\begin{array}{c}\text{conv}\\\text{chance}\end{array}\right) - \frac{G(\text{goal count})}{G(\text{session count})}}{\frac{G(\text{goal count})}{G(\text{session count})}} \right]$$

sending, by the application server, over the wide area network, the content payload to the second network server; and in response to receiving, by the second network server, over the wide area network, the content payload from the application server:

presenting, by the second network server, over the wide area network, the landing page and the content payload to the client computer such that the browser displays at least one of the at least two of the service provider identifiers hyperlinked within the landing page;

instructing, by the second network server, over the wide area network, based on the presenting, a programmatic telephony service to dynamically provision an extension number to a phone number;

associating, by the second network server, based on the instructing, at least one of the at least two of the service provider identifiers displayed within the landing page with the extension number; and binding, by the second network server, based on the associating, a phone call to the landing page, wherein the phone call is originated from the client computer.

2. The method of claim 1, wherein the characteristic is selected from a group consisting of a campaign identifier associated with the content unit, a referring content unit identifier associated with the content unit, a geographic location associated with the client computer, a predicted cost for a registered keyword that was searched by a search engine server, and a predicted conversion rate for the registered keyword.

3. The method of claim 1, wherein the determining comprises determining, by the application server, an order of presentation of the at least two of the service provider identifiers, wherein the presenting is according to the order.

4. The method of claim 3, wherein the order comprises a vertical order.

5. The method of claim 1, wherein the request comprises the search query, wherein the presenting comprises selecting or generating, by the second network server, the landing page based on the search query.

6. The method of claim 5, wherein the database stores a keyword associated with the records, wherein the selecting or the generating is based on the second network server or the application server determining whether the search query is related to or comprises the keyword.

7. The method of claim 1, wherein the hyperlink is a first hyperlink, wherein the activation is a first activation, wherein at least one of the at least two of the service provider identifiers within the landing page comprises a second hyperlink programmed to display service identifier contact information upon a second activation.

8. The method of claim 1, further comprising:
in response to receiving, by the second network server, over the wide area network, the content payload from the application server:
capturing, by the second network server, over the wide area network, based on the presenting, a visitor behavior datum as the browser displays the content payload with the at least two of the service provider identifiers within the landing page;
sending, by the second network server, over the wide area network, the visitor behavior datum to the application server;
storing, by the application server, the visitor behavior datum in the database; associating, by the application server, the visitor behavior datum with at least one of the records, wherein the determining is based on the visitor behavior datum.

9. The method of claim 1, further comprising:
in response to receiving, by the second network server, over the wide area network, the content payload from the application server:
presenting, by the second network server, over the wide area network, a telephony hyperlink in the landing page, wherein the telephony hyperlink is associated with at least one of the at least two of the service provider identifiers displayed within the landing page;
facilitating, by the second network server, a launch of a telephone call based on an activation of the telephony hyperlink, where the telephone call is originated from the client computer;
communicating, by the second network server, over the wide area network, with a network telephony server based on the facilitating;
determining, by the second network server, based on the communicating, whether the client computer placed the telephone call as though the client computer had activated the at least one of the at least two of the service provider identifiers in the landing page.

10. The method of claim 1, wherein the first network server is associated with a computerized service selected from a group consisting of a search service and a social networking service.

11. The method of claim 1, further comprising:
in response to the presenting:
modifying, by the application server, at least one of the records in the database, wherein the modifying is based on a previously collected data set informative of a proportionate resource allocation for each of the service provider identifiers based on the content payload.

12. A system for targeted content presentation based on search query analysis and dynamic provisioning of extension numbers to phone numbers, the system comprises:
a first network server configured to receive, over a wide area network, a request from a client computer in response to an activation of a hyperlink underlying a graphical presentation of a content unit in a search result page dynamically output by a second network server and comprising a plurality of search results associated with the content unit based on a search query submitted via the client computer associated with the activation, wherein the request requests a landing page from the first network server to be presented in a browser running on an operating system of the client computer, wherein the first network server is configured to identify a characteristic of the client computer based on the request;
an application server configured to receive the characteristic from the first network server, wherein the application server is configured to access a database storing a plurality of records, wherein each of the records contains a service provider identifier associated with the content unit and a plurality of preference values associated with the service provider identifier, wherein the application server is configured to determine a content payload based on the characteristic and the preference values, wherein the application server is configured to generate the content payload such that the content payload is associated with at least two of the service provider identifiers, wherein at least one of:

(a) the content payload is generated based on an apportioning engine using clickstream data collected from the client computer to determine how much value to deplete from each account associated with the at least two service provider identifiers involved in each content payload, wherein the apportioning engine generates the content payload based on an equation, wherein the equation includes $$WP(p) = \sum_{\varepsilon}^{e} \left\{ p(\text{count}[e]\text{this session}) \times \frac{G(\text{total}[\text{goals}])}{G(\text{total}[e])} \right\} +$$

$$C(\text{goal weight}) \times p\left( \frac{\text{total}[\text{goals}]}{\text{this session}} \right)$$

$$\text{Cost}(p) = X(\text{visit cost}) \times \frac{WP(p)}{\sum_{P}^{p} WP(p)}$$

or;

(b) the generating is based on an efficiency index which enables a sort of the service provider identifiers for a session associated with the presenting, wherein the sort sorts into an order which enables a maintenance of a lowest possible standard deviation of value-per-goal for the service provider identifiers, wherein the efficiency index selects the content payload of the at least two service provider identifiers to be populated on the landing page that has been requested by the client computer, wherein the efficiency index selects the content payload for the at least two of the service provider identifiers based on an equation, wherein the equation includes $$Ef(p) = C(\text{spend bias}) \times \left[ \frac{\dfrac{p(\text{amt spent})}{p(\text{budget})} - \dfrac{\sum_p^p p(\text{amt spent})}{\sum_p^p p(\text{budget})}}{\dfrac{\sum_p^p p(\text{amt spent})}{\sum_p^p p(\text{budget})}} \right] +$$

$$100 \times C(\text{CPG bias}) \times \left\{ \frac{\dfrac{p(\text{amt spent})}{p(\text{goal count})}\left[1 + p\left(\dfrac{\text{performance}}{\text{advantage}}\right)\right] - \dfrac{\sum_p^p\left[\dfrac{p(\text{amt spent})}{p(\text{goal count})}\left[1 + p\left(\dfrac{\text{performance}}{\text{advantage}}\right)\right]\right]}{G(\text{participation count})}}{\dfrac{\sum_p^p\left[\dfrac{p(\text{amt spent})}{p(\text{goal count})}\left[1 + p\left(\dfrac{\text{perf}}{\text{adv}}\right)\right]\right]}{G(\text{participation count})}} \right\}$$

$$- \left[ \frac{X\left(\dfrac{\text{conv}}{\text{chance}}\right) - \dfrac{G(\text{goal count})}{G(\text{session count})}}{\dfrac{G(\text{goal count})}{G(\text{session count})}} \right];$$

wherein the application server is configured to send, over the wide area network, the content payload to the first network server such that the first network server, in response to receiving, over the wide area network, the content payload from the application server is able to present, over the wide area network, the landing page and the content payload to the client computer such that the browser displays at least one of the at least two of the service provider identifiers hyperlinked within the landing page, wherein the second network server is configured to receive, over the wide area network, the content payload from the application and in response:

instruct, over the wide area network, based on the presenting, a programmatic telephony service to dynamically provision an extension number to a phone number, associate, based on the instructing, at least one of the at least two of the service provider identifiers displayed within the landing page with the extension number, and bind, based on the associating, a phone call to the landing page, wherein the phone call is originated from the client computer.

13. The system of claim 12, wherein the characteristic is selected from a group consisting of a campaign identifier associated with the content unit, a referring content unit identifier associated with the content unit, a geographic location associated with the client computer, a predicted cost for a registered keyword that was searched by a search engine server, and a predicted conversion rate for the registered keyword.

14. The system of claim 12, wherein the application server is configured to determine an order of presentation of the at least two of the service provider identifiers such that the first network server is able to present according to the order.

15. The system of claim 14, wherein the order comprises a vertical order.

16. The system of claim 12, wherein the request comprises the search query, wherein the first network is configured to present via selecting or generating the landing page based on the search query.

17. The system of claim 16, wherein the database stores a keyword associated with the records, wherein the selecting or the generating is based on the first network server or the application server determining whether the search query is related to or comprises the keyword.

18. The system of claim 12, wherein the first network server is configured to capture, over the wide area network, based on the presenting, a visitor behavior datum as the browser displays the content payload with the at least two of the service provider identifiers within the landing page in response to the first network server receiving, over the wide area network, the content payload from the application server, wherein the first network server is configured to send, over the wide area network, the visitor behavior datum to the application server, wherein the application is configured to store, the visitor behavior datum in the database, wherein the application server is configured to associate the visitor behavior datum with at least one of the records, wherein the content payload is based on the visitor behavior datum.

* * * * *